(12) United States Patent
Guo et al.

(10) Patent No.: US 10,972,237 B2
(45) Date of Patent: Apr. 6, 2021

(54) REFERENCE SIGNAL SENDING METHOD AND REFERENCE SIGNAL SENDING APPARATUS

(71) Applicant: Huawei Technologies Co., Ltd., Shenzhen (CN)

(72) Inventors: Zhiheng Guo, Beijing (CN); Wei Sun, Shenzhen (CN); Xinqian Xie, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 13 days.

(21) Appl. No.: 16/272,853

(22) Filed: Feb. 11, 2019

(65) Prior Publication Data

US 2019/0173645 A1 Jun. 6, 2019

Related U.S. Application Data

(63) Continuation of application No. PCT/CN2017/096445, filed on Aug. 8, 2017.

(30) Foreign Application Priority Data

Aug. 12, 2016 (CN) .......................... 201610666616.1

(51) Int. Cl.
*H04L 5/00* (2006.01)
*H04W 88/08* (2009.01)

(52) U.S. Cl.
CPC .......... *H04L 5/0048* (2013.01); *H04L 5/0007* (2013.01); *H04L 5/0005* (2013.01); *H04L 5/0016* (2013.01); *H04W 88/08* (2013.01)

(58) Field of Classification Search
None
See application file for complete search history.

(56) References Cited

U.S. PATENT DOCUMENTS 8,315,225 B2 * 11/2012 Xu ........................ H04L 5/0051
370/330
10,205,501 B2 * 2/2019 Chen ..................... H04L 1/0009
(Continued)

FOREIGN PATENT DOCUMENTS

| CN | 101222459 A | 7/2008 |
| CN | 101296212 A | 10/2008 |

(Continued)

*Primary Examiner* — Bunjob Jaroenchonwanit
(74) *Attorney, Agent, or Firm* — Leydig, Voit & Mayer, Ltd.

(57) ABSTRACT

The reference signal sending method includes: determining, by a first sending device, a first reference signal and a first code resource, where the first code resource is orthogonal to a second code resource, the second code resource is used to transmit a second reference signal; and sending, by the first sending device, the first reference signal by using the first code resource, where the first reference signal is carried on at least one first time-frequency resource group, a value of a quantity of resource elements (REs) occupied by each of the at least one first time-frequency resource group is the same as a value of a length of the first code resource, and the first reference signal and the second reference signal are multiplexed on a time-frequency resource occupied by the at least one first time-frequency resource group, based on the first code resource and the second code resource.

11 Claims, 11 Drawing Sheets

(56) References Cited

U.S. PATENT DOCUMENTS

| | | | |
|---|---|---|---|
| 10,218,481 B2* | 2/2019 | Lee | H04L 23/00 |
| 2008/0049668 A1 | 2/2008 | Kakura et al. | |
| 2008/0298433 A1 | 12/2008 | Tiirola et al. | |
| 2010/0322097 A1* | 12/2010 | Jen | H04L 5/005 370/252 |
| 2011/0194528 A1 | 8/2011 | Dang et al. | |
| 2011/0280206 A1* | 11/2011 | Johansson | H04W 72/1289 370/329 |
| 2012/0044902 A1* | 2/2012 | Sun | H04L 5/0023 370/329 |
| 2012/0127952 A1* | 5/2012 | Tong | H04B 7/0413 370/330 |
| 2012/0213193 A1 | 8/2012 | Kwon et al. | |
| 2012/0236798 A1* | 9/2012 | Raaf | H04L 5/0048 370/328 |
| 2013/0039293 A1* | 2/2013 | Lin | H04L 1/0038 370/329 |
| 2013/0051505 A1* | 2/2013 | Singh | H04L 27/265 375/346 |
| 2013/0088949 A1* | 4/2013 | Zhang | H04L 5/0007 370/208 |
| 2013/0107694 A1 | 5/2013 | Hu et al. | |
| 2013/0170467 A1* | 7/2013 | Ogawa | H04L 5/0012 370/329 |
| 2013/0176987 A1* | 7/2013 | Kawamura | H04L 5/005 370/330 |
| 2013/0308555 A1* | 11/2013 | Ho | H04L 5/0048 370/329 |
| 2014/0105320 A1* | 4/2014 | Wang | H04L 1/0606 375/267 |
| 2014/0161205 A1* | 6/2014 | Jalloul | H04L 5/0016 375/295 |
| 2014/0204913 A1* | 7/2014 | Hu | H04J 13/18 370/335 |
| 2014/0328283 A1* | 11/2014 | Wan | H04W 28/18 370/329 |
| 2015/0085822 A1* | 3/2015 | Ko | H04J 13/00 |
| 2015/0124724 A1* | 5/2015 | Yang | H04W 72/042 370/329 |
| 2015/0236775 A1* | 8/2015 | Lee | H04L 5/0007 375/267 |
| 2016/0173255 A1* | 6/2016 | Lee | H04L 5/0007 370/330 |
| 2016/0197666 A1* | 7/2016 | Kim | H04B 7/14 370/315 |
| 2016/0323013 A1 | 11/2016 | Nakao et al. | |
| 2016/0365958 A1* | 12/2016 | Nam | H04L 5/0048 |
| 2017/0041867 A1* | 2/2017 | Itagaki | H04W 52/02 |
| 2017/0238261 A1 | 8/2017 | Benjebbour et al. | |
| 2017/0288831 A1* | 10/2017 | Cezanne | H04W 72/005 |
| 2018/0091206 A1* | 3/2018 | Bhattad | H04L 25/03866 |
| 2018/0242348 A1* | 8/2018 | Chendamarai | H04W 72/042 |
| 2019/0052502 A1* | 2/2019 | Ren | H04L 27/2649 |
| 2019/0132833 A1* | 5/2019 | Maeda | H04W 28/26 |
| 2019/0149295 A1* | 5/2019 | Wang | H04W 72/0446 370/336 |
| 2019/0356433 A1* | 11/2019 | Lee | H04L 5/005 |
| 2020/0163065 A1* | 5/2020 | Noh | H04L 5/14 |
| 2020/0212982 A1* | 7/2020 | Park | H04L 5/00 |
| 2020/0212983 A1* | 7/2020 | Cha | H04L 1/16 |

FOREIGN PATENT DOCUMENTS

| | | |
|---|---|---|
| CN | 101626620 A | 1/2010 |
| CN | 101771443 A | 7/2010 |
| JP | 2008053866 A | 3/2008 |
| JP | 2010525708 A | 7/2010 |
| JP | 2010525728 A | 7/2010 |
| JP | 2013532429 A | 8/2013 |
| WO | 2010067598 A1 | 6/2010 |
| WO | 2011015065 A1 | 2/2011 |
| WO | 2016027556 A1 | 2/2016 |
| WO | 2016099978 A2 | 6/2016 |

* cited by examiner

☐ ■ REs included in a time-
domain resource set

■ REs included in a time-
domain resource group

☐ ■ REs included in a time-
domain resource set

■ REs included in a time-
domain resource group

US 10,972,237 B2

REFERENCE SIGNAL SENDING METHOD AND REFERENCE SIGNAL SENDING APPARATUS

CROSS-REFERENCE TO RELATED DISCLOSURES

This application is a continuation of International Application No. PCT/CN2017/096445, filed on Aug. 8, 2017, which claims priority to Chinese Patent Application No. 201610666616.1, filed on Aug. 12, 2016. The disclosures of the aforementioned applications are hereby incorporated by reference in their entireties.

TECHNICAL FIELD

Embodiments of the present invention relate to the communications field, and more specifically, to a reference signal sending method and a reference signal sending apparatus.

BACKGROUND

With development of communications technologies, a reference signal (RS) or a pilot signal is widely applied.

From the perspective of a function or a corresponding channel, reference signals may be classified into a plurality of different types. Currently, reference signals of different types use different time-frequency patterns. To be specific, time-frequency resources carrying reference signals of different types are at different locations of system time-frequency resources, or reference signals of different types need to be transmitted by using different time-frequency resources. Consequently, overheads of the system time-frequency resources are relatively high.

SUMMARY

Embodiments of the present invention provide a reference signal sending method, a reference signal receiving method, a reference signal sending apparatus, and a reference signal receiving apparatus, to reduce time-frequency resource overheads.

According to a first aspect, a reference signal sending method is provided, including: determining, by a first sending device, a first reference signal and a first code resource, where the first code resource is orthogonal to a second code resource, the second code resource is used to transmit a second reference signal, the first reference signal is a reference signal of a first type, the second reference signal is a reference signal of a second type, and the first type is different from the second type; and sending, by the first sending device, the first reference signal by using the first code resource, where the first reference signal is carried on at least one first time-frequency resource group, where a value of a quantity of resource elements (REs) occupied by each of the at least one first time-frequency resource group is the same as a value of a length of the first code resource, and the first reference signal and the second reference signal are multiplexed on a time-frequency resource occupied by the at least one first time-frequency resource group, based on the first code resource and the second code resource.

Therefore, the first reference signal and the second reference signal that have different signal types can be multiplexed on a same time-frequency resource.

With reference to the first aspect, in a first possible implementation of the first aspect, the second reference signal is carried on at least one second time-frequency resource group, where a value of a quantity of REs occupied by each of the at least one second time-frequency resource group is the same as a value of a length of the second code resource, the quantity of REs occupied by each of the at least one second time-frequency resource group is the same as or different from the quantity of REs occupied by each of the at least one first time-frequency resource group, and the at least one second time-frequency resource group and the at least one first time-frequency resource group occupy a same time-frequency resource.

To be specific, the first reference signal and the second reference signal that have different signal types (or use different code resources) are corresponding to different time-frequency resource groups, so that time-frequency resource groups used to carry reference signals can be determined based on the first reference signal and the second reference signal that have different signal types (or different used code resources), thereby facilitating time-frequency resource allocation and improving communication efficiency.

With reference to the first aspect and the foregoing implementation, in a second implementation of the first aspect, each of the at least one first time-frequency resource group occupies 4N REs, each of the at least one second time-frequency resource group occupies 4M REs, N is an integer greater than or equal to 1, and M is an integer greater than or equal to 1.

A quantity of REs included in a time-frequency resource group is an integer multiple of 4, so that a quantity of reference signals multiplexed on the time-frequency resource group can be increased, thereby improving resource utilization.

With reference to the first aspect and the foregoing implementations, in a third implementation of the first aspect, a function of a reference signal of the first type is different from a function of a reference signal of the second type, and the function of the reference signal of the first type and the function of the reference signal of the second type are two of the following functions: automatic gain control AGC adjustment, time-frequency synchronization, phase compensation, physical data channel demodulation, physical control channel demodulation, channel state information measurement, beam state information measurement, beam refinement information measurement, radio resource management RRM measurement, or positioning measurement; or uplink/downlink directions of a reference signal of the first type and a reference signal of the second type are different.

Therefore, a sending device can easily determine whether a plurality of reference signals can be multiplexed on a same time-frequency resource.

With reference to the first aspect and the foregoing implementations, in a fourth implementation of the first aspect, the sending, by the first sending device, the first reference signal by using the first code resource includes: sending, by the first sending device, the first reference signal to a first receiving device by using the first code resource, where the second reference signal is sent to a second receiving device.

Therefore, reference signals that need to be sent to different receiving devices can be multiplexed on a same time-frequency resource.

With reference to the first aspect and the foregoing implementations, in a fifth implementation of the first aspect, the reference signal sending method further includes: sending, by the first sending device, the second reference signal to the second receiving device by using the second code resource, where the first sending device is a network device, the first receiving device is a terminal device, and the second receiving device is a network device.

With reference to the first aspect and the foregoing implementations, in a sixth implementation of the first aspect, the second reference signal is sent by a second sending device.

Therefore, reference signals from different sending devices can be multiplexed on a same time-frequency resource.

With reference to the first aspect and the foregoing implementations, in a seventh implementation of the first aspect, the sending, by the first sending device, the first reference signal by using the first code resource includes: sending, by the first sending device, the first reference signal to the first receiving device by using the first code resource, where the second reference signal is sent to the second receiving device, the first sending device is a terminal device, the first receiving device is a network device, the second sending device is a network device, and the second receiving device is a terminal device.

With reference to the first aspect and the foregoing implementations, in an eighth implementation of the first aspect, the at least one first time-frequency resource group belongs to a first time-frequency resource set, the second reference signal is carried on the at least one second time-frequency resource group, and the at least one second time-frequency resource group belongs to the first time-frequency resource set.

A time-frequency resource set is configured, and a sending device and a receiving device determine, from the time-frequency resource set, a time-frequency resource used to carry a reference signal, so that resource allocation efficiency can be improved.

With reference to the first aspect and the foregoing implementations, in a ninth implementation of the first aspect, a location of the first time-frequency resource set in system time-frequency resources is a preset fixed location.

With reference to the first aspect and the foregoing implementations, in a tenth implementation of the first aspect, when the first sending device is a network device, before the sending, by the first sending device, the first reference signal by using the first code resource, the reference signal sending method further includes: sending, by the first sending device, first indication information, where the first indication information is used to indicate the first time-frequency resource set.

With reference to the first aspect and the foregoing implementations, in an eleventh implementation of the first aspect, before the sending, by the first sending device, the first reference signal by using the first code resource, the reference signal sending method further includes: sending, by the first sending device, second indication information, where the second indication information is used to indicate some or all of the at least one first time-frequency resource group in the first time-frequency resource set.

With reference to the first aspect and the foregoing implementations, in a twelfth implementation of the first aspect, when the first sending device is a terminal device, before the sending, by the first sending device, the first reference signal by using the first code resource, the reference signal sending method further includes: receiving, by the first sending device, first indication information, where the first indication information is used to indicate the first time-frequency resource set; and determining, by the first sending device, the first time-frequency resource set based on the first indication information.

With reference to the first aspect and the foregoing implementations, in a thirteenth implementation of the first aspect, before the sending, by the first sending device, the first reference signal by using the first code resource, the reference signal sending method further includes: receiving, by the first sending device, second indication information, where the second indication information is used to indicate some or all of the at least one first time-frequency resource group in the first time-frequency resource set; and determining, by the first sending device, the at least one first time-frequency resource group based on the second indication information.

According to a second aspect, a reference signal receiving method is provided, including: determining, by a first receiving device, a first code resource, where the first code resource is orthogonal to a second code resource, the first code resource is used to transmit a first reference signal, the second code resource is used to transmit a second reference signal, the first reference signal is a reference signal of a first type, the second reference signal is a reference signal of a second type, and the first type is different from the second type; and receiving, by the first receiving device, the first reference signal by using the first code resource, where the first reference signal is carried on at least one first time-frequency resource group, where a value of a quantity of resource elements (REs) occupied by each of the at least one first time-frequency resource group is the same as a value of a length of the first code resource, and the first reference signal and the second reference signal are multiplexed on a time-frequency resource occupied by the at least one first time-frequency resource group, based on the first code resource and the second code resource.

With reference to the second aspect, in a first possible implementation of the second aspect, the second reference signal is carried on at least one second time-frequency resource group, where a value of a quantity of REs occupied by each of the at least one second time-frequency resource group is the same as a value of a length of the second code resource, the quantity of REs occupied by each of the at least one second time-frequency resource group is the same as or different from the quantity of REs occupied by each of the at least one first time-frequency resource group, and the at least one second time-frequency resource group and the at least one first time-frequency resource group occupy a same time-frequency resource.

With reference to the second aspect and the foregoing implementation, in a second implementation of the second aspect, each of the at least one first time-frequency resource group occupies 4N REs, each of the at least one second time-frequency resource group occupies 4M REs, N is an integer greater than or equal to 1, and M is an integer greater than or equal to 1.

With reference to the second aspect and the foregoing implementations, in a third implementation of the second aspect, a function of a reference signal of the first type is different from a function of a reference signal of the second type, and the function of the reference signal of the first type and the function of the reference signal of the second type are two of the following functions: automatic gain control AGC adjustment, time-frequency synchronization, phase compensation, physical data channel demodulation, physical control channel demodulation, channel state information measurement, beam state information measurement, beam refinement information measurement, radio resource management RRM measurement, or positioning measurement;

or uplink/downlink directions of a reference signal of the first type and a reference signal of the second type are different.

With reference to the second aspect and the foregoing implementations, in a fourth implementation of the second aspect, the second reference signal is sent to a second receiving device.

With reference to the second aspect and the foregoing implementations, in a fifth implementation of the second aspect, the first reference signal and the second reference signal are sent by a first sending device, the first sending device is a network device, the first receiving device is a terminal device, and the second receiving device is a network device.

With reference to the second aspect and the foregoing implementations, in a sixth implementation of the second aspect, the first reference signal is sent by the first sending device, and the second reference signal is sent by a second sending device.

With reference to the second aspect and the foregoing implementations, in a seventh implementation of the second aspect, the second reference signal is sent to a second receiving device, the first sending device is a terminal device, the first receiving device is a network device, the second sending device is a network device, and the second receiving device is a terminal device.

With reference to the second aspect and the foregoing implementations, in an eighth implementation of the second aspect, the at least one first time-frequency resource group belongs to a first time-frequency resource set, the second reference signal is carried on the at least one second time-frequency resource group, and the at least one second time-frequency resource group belongs to the first time-frequency resource set.

With reference to the second aspect and the foregoing implementations, in a ninth implementation of the second aspect, a location of the first time-frequency resource set in system time-frequency resources is a preset fixed location.

With reference to the second aspect and the foregoing implementations, in a tenth implementation of the second aspect, when the first receiving device is a network device, before the receiving, by the first receiving device, the first reference signal by using the first code resource, the reference signal receiving method further includes: sending, by the first receiving device, first indication information, where the first indication information is used to indicate the first time-frequency resource set.

With reference to the second aspect and the foregoing implementations, in an eleventh implementation of the second aspect, before the receiving, by the first receiving device, the first reference signal by using the first code resource, the reference signal receiving method further includes: sending, by the first receiving device, second indication information, where the second indication information is used to indicate some or all of the at least one first time-frequency resource group in the first time-frequency resource set.

With reference to the second aspect and the foregoing implementations, in a twelfth implementation of the second aspect, when the first receiving device is a terminal device, before the receiving, by the first receiving device, the first reference signal by using the first code resource, the reference signal receiving method further includes: receiving, by the first receiving device, first indication information, where the first indication information is used to indicate the first time-frequency resource set; and determining, by the first receiving device, the first time-frequency resource set based on the first indication information.

With reference to the second aspect and the foregoing implementations, in a thirteenth implementation of the second aspect, before the receiving, by the first receiving device, the first reference signal by using the first code resource, the reference signal receiving method further includes: receiving, by the first receiving device, second indication information, where the second indication information is used to indicate some or all of the at least one first time-frequency resource group in the first time-frequency resource set; and determining, by the first receiving device, the at least one first time-frequency resource group based on the second indication information.

According to a third aspect, a reference signal sending apparatus is provided, including units configured to perform the steps in the reference signal sending method in the first aspect and the implementations of the first aspect.

According to a fourth aspect, a reference signal receiving apparatus is provided, including units configured to perform the steps in the reference signal receiving method in the second aspect and the implementations of the second aspect.

According to a fifth aspect, a reference signal sending device is provided, including a memory and a processor. The memory is configured to store a computer program, and the processor is configured to: invoke the computer program from the memory and run the computer program, so that the reference signal sending device performs the reference signal sending method in the first aspect and the implementations of the first aspect.

According to a sixth aspect, a reference signal receiving device is provided, including a memory and a processor. The memory is configured to store a computer program, and the processor is configured to: invoke the computer program from the memory and run the computer program, so that the reference signal receiving device performs the reference signal receiving method in the second aspect and the implementations of the second aspect.

According to a seventh aspect, a computer program product is provided. The computer program product includes computer program code, and when being run by a processing unit and a sending unit or by a processor and a transmitter of a sending device, the computer program code enables the sending device to perform the reference signal sending method in the first aspect and the implementations of the first aspect.

According to an eighth aspect, a computer program product is provided. The computer program product includes computer program code, and when being run by a receiving unit and a processing unit or by a receiver and a processor of a receiving device, the computer program code enables the receiving device to perform the reference signal receiving method in the second aspect and the implementations of the second aspect.

According to a ninth aspect, a computer readable storage medium is provided. The computer readable storage medium stores a program, and the program enables a sending device to perform the reference signal sending method in the first aspect and the implementations of the first aspect.

According to a tenth aspect, a computer readable storage medium is provided. The computer readable storage medium stores a program, and the program enables a receiving device to perform the reference signal receiving method in the second aspect and the implementations of the second aspect.

According to the reference signal sending method and apparatus in the embodiments of the present invention, the first reference signal and the second reference signal that are of different types are multiplexed on the same time-frequency resource for transmission, so that time-frequency resource overheads can be reduced.

DESCRIPTION OF EMBODIMENTS

Figure 1:
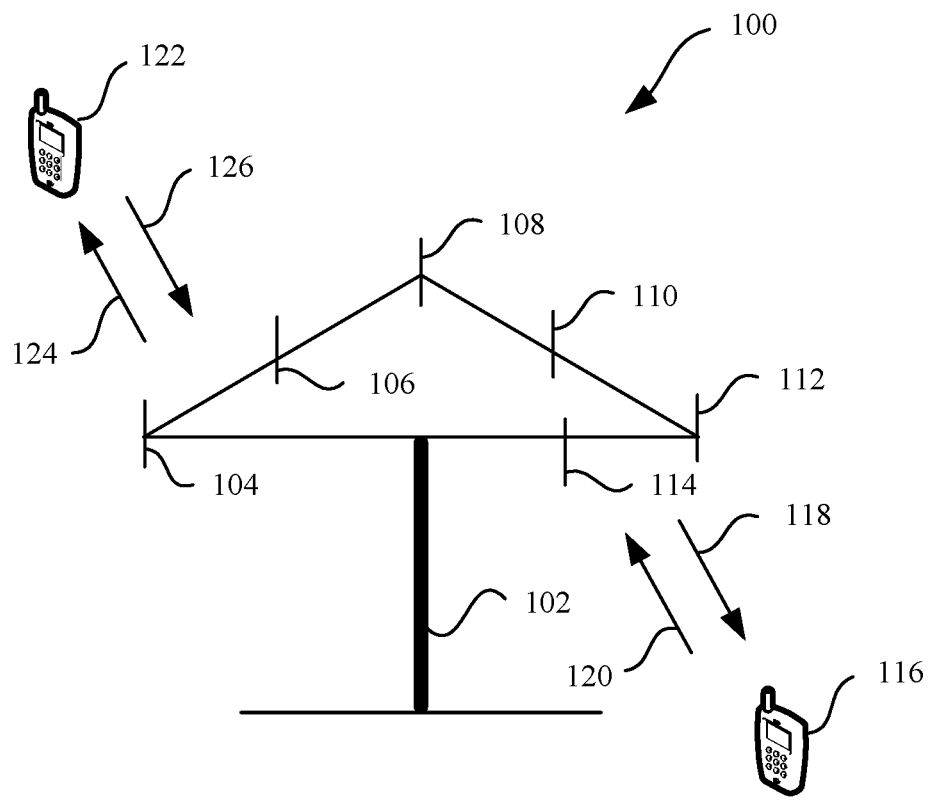
FIG. 1 is a schematic architectural diagram of a communications system according to an embodiment of the present invention.

The following describes technical solutions of this disclosure with reference to accompanying drawings.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. As shown in figures, both a computing device and a disclosure that run on the computing device may be components. One or more components may reside within a process and/or a thread of execution, and a component may be located on one computer and/or distributed between two or more computers. In addition, these components may be executed from various computer readable media that store various data structures. For example, the components may communicate by using a local and/or remote process and based on a signal having one or more data packets (for example, data from two components that interact with another component in a local system, a distributed system, and/or a network, for example, the Internet interacting with another system by using the signal).

The solutions of the embodiments of the present invention may be applied to an existing cellular communications system, for example, a Global System for Mobile Communications (GSM), a wideband code division multiple access (WCDMA) system, or a Long Term Evolution (LTE) system, and supported communication is mainly voice and data communication. Usually, a quantity of connections supported by one conventional base station is limited, and is easy to implement.

A next-generation communications system not only supports conventional communication, but also supports machine-to-machine (M2M) communication that is also referred to as Machine Type Communication (MTC). As predicted, a quantity of MTC devices that are connected to a network may reach 50 to 100 billion by 2020, and far exceeds an existing quantity of connections. For M2M services, a network requirement varies with a service category. Generally, there are the following several requirements:

transmission reliability, but insensitivity to a delay; and
a short delay and high transmission reliability.

A service that requires transmission reliability but is insensitive to a delay is easily processed. However, a service that requires a short delay and high transmission reliability has requirements for both a short transmission delay and reliability, for example, a Vehicle to Vehicle (V2V) service. If transmission is unreliable, retransmission is caused. Consequently, a transmission delay is excessively high, and the requirement cannot be met.

Because there are a large quantity of connections, a future wireless communications system greatly differs from an existing communications system. Because of the large quantity of connections, more resources need to be consumed to access a terminal device, and more resources need to be consumed to transmit scheduling signaling related to data transmission of the terminal device. The solutions of the embodiments of the present invention can be used to effectively resolve the foregoing resource consumption problems.

Optionally, a sending device may be a network device, and a receiving device may be a terminal device.

Alternatively, a sending device may be a terminal device, and a receiving device may be a network device.

Alternatively, a sending device may be a terminal device, and a receiving device may be a terminal device.

Alternatively, a sending device may be a network device, and a receiving device may be a network device.

Specifically, in the embodiments of the present invention, a reference signal may be sent by a terminal device to a network device, or a reference signal may be sent by a network device to a terminal device, or a reference signal may be sent by a terminal device to another terminal device, or a reference signal may be sent by a network device to another network device. This is not particularly limited in the embodiments of the present invention.

Optionally, the network device is a base station, and the terminal device is user equipment.

Each embodiment is described with reference to a terminal device in the embodiments of the present invention. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a station (ST) in a wireless local area network (WLAN), or may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved PLMN network, or the like.

In addition, each embodiment is described with reference to a network device in the embodiments of the present invention. The network device may be a device configured to communicate with a mobile device. The network device may be an access point (AP) in a WLAN or a base transceiver station (BTS) in GSM or Code Division Multiple Access (CDMA), or may be a NodeB (NB) in WCDMA, or may be an evolved NodeB (eNB or eNodeB) in Long Term Evolution (LTE), a regeneration station, an access point, an in-vehicle device, a wearable device, a network device in a future 5G network, a network device in a future evolved PLMN network, or the like.

In addition, each embodiment is described with reference to a cell in the embodiments of the present invention. The cell may be a cell corresponding to a network device (for example, a base station), and the cell may belong to a macro base station or a base station corresponding to a small cell. The small cell herein may include a metro cell, a micro cell, a pico cell, a femto cell, and the like. The small cells are characterized by small coverage and low transmit power, and are suitable for providing a high-rate data transmission service.

In addition, a plurality of cells may work on a same frequency on a carrier in an LTE system. In some special scenarios, it may be considered that a concept of the carrier in the LTE system is equivalent to that of the cell. For example, in a carrier aggregation (CA) scenario, when being configured with a secondary carrier, UE carries both a carrier index of the secondary carrier and a cell identity (Cell ID) of a secondary cell that works on the secondary carrier. In this case, it may be considered that the concept of the carrier is equivalent to that of the cell. For example, that the UE accesses a carrier is equivalent to that the UE accesses a cell.

A signal transmission method and apparatus provided in the embodiments of the present invention may be applied to a terminal device or a network device. The terminal device or the network device includes a hardware layer, an operating system layer running on the hardware layer, and a disclosure layer running on the operating system layer. The hardware layer includes hardware such as a central processing unit (CPU), a memory management unit (MMU), and a memory (also referred to a main memory). An operating system may be any one or more computer operating systems that implement service processing by using a process, for example, a Linux operating system, a Unix operating system, an Android operating system, an iOS operating system, or a Windows operating system. The disclosure layer includes disclosures such as a browser, an address book, word processing software, and instant messaging software. In addition, a specific structure of an execution body of the signal transmission method is not particularly limited in the embodiments of the present invention, provided that communication can be implemented according to the signal transmission method in the embodiments of the present invention by running a program that records code of the signal transmission method in the embodiments of the present invention. For example, the execution body of the signal transmission method in the embodiments of the present invention may be a terminal device or a network device, or may be a function module that can invoke the program and execute the program in a terminal device or a network device.

In addition, aspects or features in the embodiments of the present invention may be implemented as a method, an apparatus, or a product that uses standard programming and/or engineering technologies. The term "product" used in this disclosure covers a computer program that can be accessed from any computer readable component, carrier, or medium. For example, the computer readable medium may include but is not limited to a magnetic storage device (for example, a hard disk, a floppy disk, or a magnetic tape), an optical disc (for example, a compact disc (CD) or a digital versatile disc (DVD)), a smart card, and a flash memory device (for example, an erasable programmable read-only memory (EPROM), a card, a stick, or a key drive). In addition, various storage media described in this specification may indicate one or more devices and/or other machine readable media that are configured to store information. The term "machine readable media" may include but is not limited to a radio channel and various other media that can store, include, and/or carry instructions and/or data.

FIG. 1 is a schematic diagram of a communications system for information transmission according to an embodiment of the present invention. As shown in FIG. 1, the communications system 100 includes a network device 102, and the network device 102 may include a plurality of antennas such as antennas 104, 106, 108, 110, 112, and 114. In addition, the network device 102 may additionally include a transmitter chain and a receiver chain. A person of ordinary skill in the art may understand that the transmitter chain and the receiver chain may each include a plurality of components (for example, a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that the network device 102 may communicate with any quantity of terminal devices that are similar to the terminal device 116 or the terminal device 122. For example, the terminal device 116 and the terminal device 122 each may be a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal 122 by using a reverse link 126.

For example, in a frequency division duplex (FDD) system, the forward link 118 and the reverse link 120 may use different frequency bands, and the forward link 124 and the reverse link 126 may use different frequency bands.

For another example, in a time division duplex (TDD) system and a full duplex system, the forward link 118 and the reverse link 120 may use a same frequency band, and the forward link 124 and the reverse link 126 may use a same frequency band.

Each antenna (or an antenna group including a plurality of antennas) and/or area designed for communication and/is referred to as a sector of the network device 102. For example, an antenna group may be designed to communicate with a terminal device in a sector within coverage of the network device 102. In a process in which the network device 102 communicates with the terminal device 116 and the terminal device 122 respectively by using the forward links 118 and 124, transmit antennas of the network device 102 may improve signal to noise ratios of the forward links 118 and 124 through beamforming. In addition, compared with a manner in which a network device sends signals to all terminal devices by using a single antenna, when the network device 102 sends, through beamforming, signals to the terminal devices 116 and 122 that are randomly distributed in related coverage, a mobile device in a neighboring cell is less interfered with.

Within a given time, the network device 102, the terminal device 116, or the terminal device 122 may be a wireless communication sending apparatus and/or a wireless communication receiving apparatus. When sending data, the wireless communication sending apparatus may encode the data for transmission. Specifically, the wireless communication sending apparatus may obtain (for example, generate, receive from another communications apparatus, or store in a memory) a specific quantity of data bits that need to be sent to the wireless communication receiving apparatus by using a channel. The data bits may be included in a transport block (or a plurality of transport blocks) of data, and the transport block may be segmented to generate a plurality of code blocks.

In addition, the communications system 100 may be a public land mobile network (PLMN), a D2D network, an M2M network, or another network. FIG. 1 is merely a simplified schematic diagram of an example, and the network may further include another network device that is not shown in FIG. 1.

It should be noted that in this embodiment of the present invention, a sending device may be the network device 102, or may be the terminal device (for example, the terminal device 116 or the terminal device 122). Correspondingly, a receiving device may be the terminal device (for example, the terminal device 116 or the terminal device 122), or may be the network device 102. This is not particularly limited in this embodiment of the present invention.

The following describes a transmission object in detail in this embodiment of the present invention.

Specifically, the transmission object in this embodiment of the present invention may be a reference signal (RS) that may also be referred to as a pilot signal, and is a known signal that is provided by the sending device for the receiving device and that is used for channel estimation, channel measurement, channel sounding, channel demodulation, or the like.

In this embodiment of the present invention, the reference signal may be applied to a physical layer, and does not carry data information from a higher layer. In addition, the reference signal may include a downlink reference signal and an uplink reference signal.

The downlink reference signal includes a cell-specific reference signal (CRS) used in downlink, a UE-specific reference signal (UE-RS) used in downlink, a channel state information-reference signal (CSI-RS) used for downlink channel measurement, a group-specific reference signal (GRS) used in downlink, a positioning reference signal (PRS) used in downlink, a beam reference signal (BRS) used in downlink, a beam refinement reference signal (BRRS) used in downlink, a phase compensation reference signal (PCRS) used in downlink, and the like. The UE-RS used in downlink is also referred to as a demodulation reference signal (DMRS) used in downlink.

The uplink reference signal includes a demodulation reference signal (DMRS) used for uplink demodulation, a sounding reference signal (SRS) used for uplink channel measurement, a PCRS used in uplink, and the like. A DMRS used for PUCCH demodulation is referred to as a PUCCH DMRS, and a DMRS used for PUSCH demodulation is referred to as a PUSCH DMRS.

In addition to the reference signal, the transmission object in this embodiment of the present invention may alternatively be a sequence signal in a sequence signal set having good correlation features. The good correlation feature means that any sequence in the set has a relatively large autocorrelation peak, and any two sequences in the set have a relatively small cross-correlation peak. To be specific, in this embodiment of the present invention, the sending device may send a plurality of signals, and at least one of the signals is the sequence signal having the good correlation feature, for example, a pseudo random sequence and a Zadoff-chu sequence.

Specifically, correlation means that correlation calculation is performed between one sequence signal and another sequence signal that are in a same set, to obtain a correlation value. Therefore, for a sequence signal having a good correlation feature, the receiving device can detect, based on the correlation feature, whether the signal exists. In other words, the sequence signal having the correlation feature is transmitted without a need to use a detection mechanism such as a pilot. A reference signal (or a pilot signal) may be one of signals having good correlation features.

It should be understood that the foregoing listed specific example of the sequence signal is merely an example for description, and this embodiment of the present invention is not limited thereto. For example, the sequence signal may alternatively be a signal used to carry feedback information (for example, acknowledgement (ACK) information or negative acknowledgement (NACK) information), a resource request signal, or a measurement request signal.

For ease of understanding and description, the following uses a reference signal as an example to describe a signal transmission process in this embodiment of the present invention.

In this embodiment of the present invention, a signal (for example, a reference signal) has one or more signal parameters (also referred to as attribute parameters), and signals of different types have at least one different signal parameter. In other words, in this embodiment of the present invention, signals may be classified into a plurality of types based on signal parameters. In this case, in this embodiment of the present invention, that "a first type is different from a second type" may mean that a category of a first reference signal is different from that of a second reference signal.

In addition, optionally, a reference signal of the first type and a reference signal of the second type have at least one different signal parameter. The signal parameter includes at least one of the following parameters: a channel corresponding to the signal, a function of the signal, a link to which the signal is applied, a transmission direction of the signal, a carrier used by a cell to which a transmission device of the signal belongs, and a sending device of the signal.

In other words, in this embodiment of the present invention, a category of a reference signal may be classified based on a signal parameter of the reference signal.

The following describes in detail the signal parameters and signal parameter-based category classification methods.

A signal parameter A is a channel corresponding to a signal.

Optionally, the channel corresponding to the signal includes a channel used to transmit data or a channel used to transmit control information.

Specifically, in this embodiment of the present invention, for example, a signal may be classified based on a channel (or a corresponding channel) to which the signal (for example, a reference signal) is applied.

The channel may include A1 and A2.

A1 indicates a channel used to transmit data, for example:
a physical uplink shared channel (PUSCH) or a physical downlink shared channel (PDSCH).

A2 indicates a channel used to transmit control information, for example:
a physical uplink control channel (PUCCH) or a physical downlink control channel (PDCCH).

It should be understood that the foregoing listed specific channel is merely an example for description, and this embodiment of the present invention is not limited thereto. For example, the channel may further include an enhanced physical downlink control channel (EPDCCH), a physical control format indicator channel (PCFICH), a physical hybrid automatic repeat request indicator channel (PHICH), or a new channel that is introduced in a standard and that has a same function but a different name, for example, a control channel introduced in short TTI transmission such as a short TTI physical downlink control channel (sTTI PDCCH), or a data channel introduced in short TTI transmission such as a short TTI physical downlink shared channel (sTTI PDSCH).

To be specific, in this embodiment of the present invention, that "the reference signal of the first type and the reference signal of the second type have at least one different signal parameter" may include the following meaning: A channel to which the reference signal of the first type is applied is different from a channel to which the reference signal of the second type is applied. For example, a channel corresponding to the first signal may be one of the channels (for example, the PUCCH, the PUSCH, the PDCCH, or the PDSCH) indicated by A1 and A2, and a channel corresponding to the second signal may be the other of the channels (for example, the PUCCH, the PUSCH, the PDCCH, or the PDSCH) indicated by A1 and A2.

A signal parameter B is a function of a signal.

Optionally, a function of a reference signal of the first type is different from a function of a reference signal of the second type, and the function of the reference signal of the first type and the function of the reference signal of the second type are two of the following functions: phase compensation, ACK/NACK information carrying, resource request information carrying, measurement request information carrying, automatic gain control AGC adjustment, time-frequency synchronization, physical data channel demodulation, physical control channel demodulation, channel state information measurement, beam state information measurement, beam refinement information measurement, radio resource management RRM measurement, or positioning measurement.

Specifically, in this embodiment of the present invention, for example, a signal may be classified based on a function of the signal (for example, a reference signal).

The function may include B1, B2, B3, B4, B5, B6, B7, B8, B9, B10, and B11.

B1 indicates data channel demodulation.

Specifically, a channel carrying a signal (for example, a reference signal) in this embodiment of the present invention may carry modulated data, so that the signal (for example, the reference signal) may be used to demodulate the data.

As an example rather than a limitation, the signal used for channel demodulation may be, for example, a demodulation reference signal (DMRS) or a common reference signal (CRS).

In addition, a specific method and process of "data channel demodulation" in this embodiment of the present invention may be similar to those in the prior art. To avoid repetition, detailed description is omitted herein.

In addition, as an example rather than a limitation, a channel (or a demodulated channel) to which the signal (for example, the DMRS) used for data channel demodulation is applied may be an uplink channel (for example, a PUSCH), or may be a downlink channel (for example, a PDSCH). This is not particularly limited in this embodiment of the present invention.

B2 indicates control channel demodulation.

Specifically, a channel carrying a signal (for example, a reference signal) in this embodiment of the present invention may carry modulated control information, so that the signal (for example, the reference signal) may be used to demodulate the control information.

As an example rather than a limitation, the signal used for channel demodulation may be, for example, a DMRS or a CRS.

In addition, a specific method and process of "control channel demodulation" in this embodiment of the present invention may be similar to those in the prior art. To avoid repetition, detailed description is omitted herein.

In addition, as an example rather than a limitation, a channel (or a demodulated channel) to which the signal (for example, the DMRS) used for control channel demodulation is applied may be an uplink channel (for example, a PUCCH), or may be a downlink channel (for example, a PDCCH). This is not particularly limited in this embodiment of the present invention.

B3 indicates channel state information measurement.

Specifically, a signal (for example, a reference signal) in this embodiment of the present invention may be used to measure a channel carrying the signal, for example, measure channel quality.

As an example rather than a limitation, the signal used for channel measurement may be, for example, a channel state information-reference signal (CSI-RS), a sounding reference signal (SRS), or a common reference signal (CRS).

In addition, a specific method and process of "channel measurement" in this embodiment of the present invention may be similar to those in the prior art. To avoid repetition, detailed description is omitted herein.

In addition, as an example rather than a limitation, a channel (or a measured channel) to which the signal (for example, the DMRS) used for channel measurement is applied may be an uplink channel (for example, a PUSCH or a PUCCH), or may be a downlink channel (for example, a PDCCH or a PDSCH). This is not particularly limited in this embodiment of the present invention.

B4 indicates phase compensation.

Specifically, a signal (for example, a reference signal) in this embodiment of the present invention may be used to measure a common phase error (CPE) and inter-subcarrier interference (ICI).

As an example rather than a limitation, the signal used for channel measurement may be, for example, a phase compensation reference signal or a channel state information-reference signal (CSI-RS).

In addition, a specific method and process of "phase compensation" in this embodiment of the present invention may be similar to those in the prior art. To avoid repetition, detailed description is omitted herein.

B5 indicates feedback information carrying.

Specifically, a signal (for example, a reference signal) in this embodiment of the present invention may be used for feedback processing, for example, hybrid automatic repeat request (HARD) processing. In other words, the signal (for example, a first signal and/or a second signal) may be used to carry feedback information such as acknowledgement ACK information or NACK information.

B6 indicates resource request information carrying.

Specifically, a signal (for example, a reference signal) in this embodiment of the present invention may be used to perform a resource request process. In other words, the signal may be a signal used to carry resource request information (for example, resource scheduling request information). As an example rather than a limitation, the resource request information may be request information for requesting to allocate a time-frequency resource used to transmit data (for example, uplink data or downlink data).

B7 indicates measurement request information carrying.

Specifically, a signal (for example, a reference signal) in this embodiment of the present invention may be used to perform a measurement request process. In other words, the signal may be a signal used to carry measurement request information. As an example rather than a limitation, the measurement request information may be request information for requesting to send a downlink measurement reference signal.

B8 indicates automatic gain control AGC adjustment.

Specifically, automatic gain control (AGC) is an automatic control method that enables a gain of an amplification circuit to automatically vary with a signal strength. The automatic gain control is one type of amplitude limiting output, and is used to adjust an output signal by using an effective combination of linear amplification and compressed amplification. When a weak signal is input, a linear amplification circuit works to ensure a strength of an output signal. When an input signal reaches a specific strength, a compressed amplification circuit is started to decrease an output amplitude. In other words, a function of the AGC is automatically controlling an amplitude of the automatic control gain by modifying an input and output amplification proportion.

The signal (for example, the reference signal) in this embodiment of the present invention may be used to perform an AGC adjustment process. In addition, usage and a use method of the reference signal in an AGC adjustment process may be similar to those in the prior art. To avoid repetition, detailed description is omitted herein.

B9 indicates time-frequency synchronization.

A signal (for example, a reference signal) in this embodiment of the present invention may be used for time-frequency synchronization. In addition, usage and a use method of the reference signal in a time-frequency synchronization process may be similar to those in the prior art. To avoid repetition, detailed description is omitted herein.

B10 indicates radio resource management RRM measurement.

Specifically, radio resource management (RRM) is to ensure service quality for a wireless user terminal in a network when bandwidth is limited. A basic starting point is to flexibly allocate and dynamically adjust available resources of wireless transmission and networks when network traffic is distributed unevenly, and a channel feature varies with channel attenuation and interference, so as to improve wireless spectrum utilization to a greatest extent, avoid network congestion, and maintain signaling load as low as possible.

A signal (for example, a reference signal) in this embodiment of the present invention may be used to perform an RRM measurement process. In addition, usage and a use method of the reference signal in the RRM measurement process may be similar to those in the prior art. To avoid repetition, detailed description is omitted herein.

B11 indicates positioning measurement.

A signal (for example, a reference signal) in this embodiment of the present invention may be used to perform a positioning measurement process. In addition, usage and a use method of the reference signal in the positioning measurement process may be similar to those in the prior art. To avoid repetition, detailed description is omitted herein.

To be specific, in this embodiment of the present invention, that "the reference signal of the first type and the reference signal of the second type have at least one different signal parameter" may include the following meaning: A function of the reference signal of the first type is different from a function of the reference signal of the second type. For example, the function of the reference signal of the first type may be one of the functions indicated by B1 to B11, and the function of the reference signal of the second type may be another one of the functions indicated by B1 to B11.

A signal parameter C is a link to which a signal is applied.

Optionally, the link to which the signal is applied includes a link between a network device and a terminal device, a link between network devices, or a link between terminal devices.

Specifically, in this embodiment of the present invention, for example, a signal may be classified based on a link (or a corresponding link) to which the signal (for example, a reference signal) is applied.

The link may include C1, C2, and C3.

C1 indicates a link between a network device and a terminal device.

The link may also be referred to as a cellular link, and is used for communication between a network device (for example, an eNB) and a terminal device.

C2 indicates a link between network devices.

The link may also be referred to as a backhaul (backhaul) link, and is used for communication between a network device (for example, an eNB) and another network device (for example, an eNB or a gateway device).

C3 indicates a link between terminal devices.

The link may also be referred to as a sidelink link, and is used for communication between terminal devices.

To be specific, in this embodiment of the present invention, that "the reference signal of the first type and the reference signal of the second type have at least one different signal parameter" may include the following meaning: A link to which the reference signal of the first type is applied is different from a link to which the reference signal of the second type is applied. For example, the link corresponding to the reference signal of the first type may be one of the links indicated by C1 to C3, and the link corresponding to the reference signal of the second type may be another one of the links indicated by C1 to C3.

A signal parameter D is a transmission direction of a signal.

Optionally, the transmission direction of the signal includes uplink transmission or downlink transmission.

Specifically, in this embodiment of the present invention, for example, a signal may be classified based on a transmission direction of the signal.

The transmission direction may include D1 and D2.

D1 indicates uplink transmission.

In this case, the signal may be sent by a terminal device to a network device.

D2 indicates downlink transmission.

In this case, the signal may be sent by a network device to a terminal device.

To be specific, in this embodiment of the present invention, that "the reference signal of the first type and the reference signal of the second type have at least one different signal parameter" may include the following meaning: A transmission direction of the reference signal of the first type is different from a transmission direction of the reference signal of the second type. For example, the transmission direction of the reference signal of the first type may be one of the transmission directions indicated by D1 and D2, and the transmission direction of the reference signal of the second type may be the other of the transmission directions indicated by D1 and D2.

A signal parameter E is a carrier used by a cell to which a transmission device of a signal belongs.

Specifically, in this embodiment of the present invention, the carrier may be a carrier of a cell in which a network device or a terminal device that sends or receives the signal is located.

To be specific, in this embodiment of the present invention, that "the reference signal of the first type and the reference signal of the second type have at least one different signal parameter" may include the following meaning: A carrier (which is referred to as a first carrier below for ease of understanding and description) of a cell in which a first device (namely, a network device or a terminal device that transmits the reference signal of the first type) is located is different from a carrier (which is referred to as a second carrier below for ease of understanding and description) of a cell in which a second device (namely, a network device or a terminal device that transmits the reference signal of the second type) is located, and the first carrier and the second carrier overlap.

That "the first carrier is different from the second carrier, and the first carrier and the second carrier overlap" may include the following meanings:

1. A frequency domain range of the first carrier is larger than a frequency domain range of the second carrier, and the frequency domain range of the second carrier falls within the frequency domain range of the first carrier.

2. A frequency domain range of the first carrier is smaller than a frequency domain range of the second carrier, and the frequency domain range of the first carrier falls within the frequency domain range of the second carrier.

3. A frequency domain range of the first carrier is different from a frequency domain range of the second carrier, and the frequency domain range of the first carrier and the frequency domain range of the second carrier partially overlap.

A signal parameter F is a sending device of a signal.

To be specific, in this embodiment of the present invention, that "the reference signal of the first type and the reference signal of the second type have at least one different signal parameter" may include the following meaning: A sending device of the reference signal of the first type is different from a sending device of the reference signal of the second type.

That "the sending device of the reference signal of the first type is different from the sending device of the reference signal of the second type" may mean that the sending device of the reference signal of the first type is a network device, and the sending device of the reference signal of the second type is a terminal device.

Alternatively, that "the sending device of the reference signal of the first type is different from the sending device of the reference signal of the second type" may mean that the sending device of the reference signal of the first type is a terminal device, and the sending device of the reference signal of the second type is a network device.

Alternatively, that "the sending device of the reference signal of the first type is different from the sending device of the reference signal of the second type" may mean that the sending device of the reference signal of the first type is a terminal device, and the sending device of the reference signal of the second type is another terminal device. The terminal device sending the reference signal of the first type and the terminal device sending the reference signal of the second type may be in a same cell (for example, access a same network device), or may be in different cells (for example, access different network devices). This is not particularly limited in this embodiment of the present invention.

Alternatively, that "the sending device of the reference signal of the first type is different from the sending device of the reference signal of the second type" may mean that the sending device of the reference signal of the first type is a network device, and the sending device of the reference signal of the second type is another network device. The network device sending the reference signal of the first type and the network device sending the reference signal of the second type may be deployed in a same frequency, or may be deployed in different frequencies. This is not particularly limited in this embodiment of the present invention.

It should be understood that the foregoing listed signal parameters are merely examples for description, and this embodiment of the present invention is not limited thereto. For example, the function of the reference signal may alternatively be beam state information measurement or beam refinement information measurement.

Figure 2:
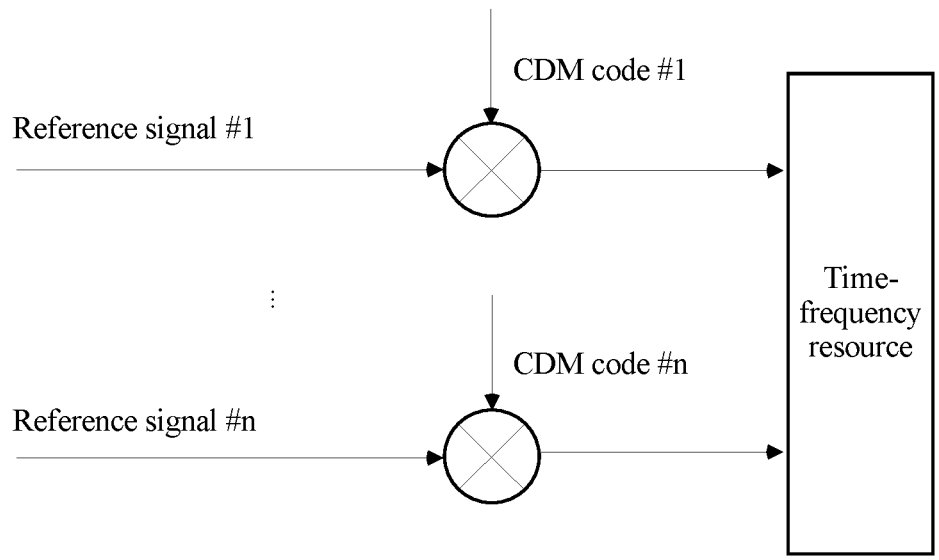
FIG. 2 is a schematic diagram of an example of a reference signal sending manner according to an embodiment of the present invention.

As shown in FIG. 2, in this embodiment of the present invention, reference signals of different types may be multiplexed on a same time-frequency resource based on different code resources.

Optionally, the code resource includes code division multiplexing CDM code.

Specifically, in this embodiment of the present invention, for example, the reference signals of different types may be multiplexed on a time-frequency resource for transmission, based on a code division multiplexing (CDM) technology. CDM is a communication manner of implementing multiplexing by using orthogonality between signal code type structures.

Code division multiplexing is a channel sharing method. Each user may perform communication by using a same frequency band at the same time, and uses a code type-based channel segmentation method. To be specific, one address code is allocated to each user, and code types are different. Therefore, communication parties do not interfere with each other, and have strong interference immunities, so as to help a transmit end to better use a reference signal by adjusting signal power.

It should be understood that the foregoing listed CDM code used as a code resource is merely an example for description, and this embodiment of the present invention is not limited thereto. Other code resources that can be used to transmit reference signals shall fall within the protection scope of the embodiments of the present invention.

Figure 3:
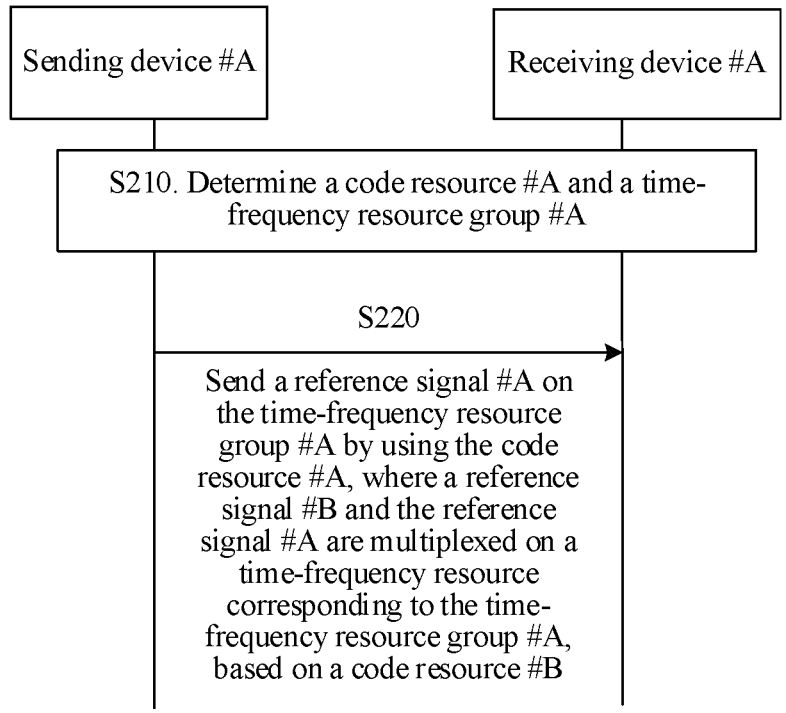
FIG. 3 is a schematic interaction diagram of a reference signal receiving and sending method according to an embodiment of the present invention.

FIG. 3 is a schematic flowchart of a reference signal receiving and sending method 200 according to an embodiment of the present invention. As shown in FIG. 3, the method 200 includes the following steps.

In S210, a sending device #A (namely, an example of a first sending device) generates a reference signal #A (namely, an example of a first reference signal). A process of generating the reference signal #A may be similar to that in the prior art. To avoid repetition, detailed description is omitted herein.

It should be noted that in this embodiment of the present invention, the reference signal #A is a reference signal of a type #A (namely, an example of a first type). Herein, the type #A may be determined based on any one of the foregoing signal parameters A to F. This is not particularly limited in this embodiment of the present invention.

In addition, the sending device #A may determine a code resource (such as CDM code, which is marked as a code resource #A below for ease of understanding and distinguishing) corresponding to the reference signal #A. "The code resource corresponding to the reference signal #A" may be understood as follows: The reference signal #A is multiplexed on a time-frequency resource (which is specifically one or more first time-frequency resource groups, and detailed description is provided subsequently) based on the code resource #A.

As an example rather than a limitation, in this embodiment of the present invention, a length of a code resource may be determined based on a quantity of reference signals that are multiplexed on a same time-frequency resource. For example, if a length of a code resource is 4, four reference signals may be multiplexed on a same time-frequency resource. If a length of a code resource is 8, eight reference signals may be multiplexed on a same time-frequency resource.

In addition, for example, in this embodiment of the present invention, a code resource corresponding to each reference signal may be determined by a network device (which may be used as a sending device or a receiving device of the reference signal) and notified to a terminal device (which may be used as a sending device or a receiving device of the reference signal).

For another example, in this embodiment of the present invention, a code resource corresponding to each reference signal may be determined by a network device (which may be used as a sending device or a receiving device of the reference signal) and another network device (which may be used as a sending device or a receiving device of the reference signal) through negotiation.

For still another example, in this embodiment of the present invention, a code resource corresponding to each type of reference signal may be stipulated by a communications system or a communications protocol, so that a code resource corresponding to an actually sent reference signal can be determined based on a type of the reference signal.

It should be understood that the foregoing listed code resource determining method is merely an example for description, and this embodiment of the present invention is not limited thereto. The code resource determining method in this embodiment of the present invention may be similar to that in the prior art. To avoid repetition, detailed description is omitted herein.

The code resource #A is orthogonal to a code resource (such as CDM code, which is marked as a code resource #B below for ease of understanding and distinguishing) corresponding to a reference signal #B (namely, an example of a second reference signal).

"The code resource corresponding to the reference signal #B" may be understood as follows: The reference signal #B is multiplexed on a time-frequency resource (which is specifically one or more second time-frequency resource groups, where the one or more second time-frequency resource groups and the one or more first time-frequency resource groups occupy a same time-frequency resource, and detailed description is provided subsequently) based on the code resource #B.

Therefore, the reference signal #A and the reference signal #B may be multiplexed on a same time-frequency resource by using the code resource #A and the code resource #B.

It should be noted that in this embodiment of the present invention, the reference signal #B is a reference signal of a type #B (namely, an example of a second type). Herein, the type #B may be determined based on any one of the foregoing signal parameters A to F. This is not particularly limited in this embodiment of the present invention.

In other words, in this embodiment of the present invention, the reference signal #B (namely, an example of the reference signal of the second type) and the reference signal #A (namely, an example of the reference signal of the first type) are reference signals of different types.

Optionally, the first reference signal is sent to a first receiving device, and the second reference signal is sent to a second receiving device.

In other words, in this embodiment of the present invention, the reference signal #B and the reference signal #A are reference signals sent to different receiving devices.

For example, "the different receiving devices" may mean that one receiving device is a terminal device, and the other receiving device is a different terminal device.

Alternatively, "the different receiving devices" may mean that one receiving device is a network device, and the other receiving device is a different network device.

Alternatively, "the different receiving devices" may mean that one receiving device is a network device, and the other receiving device is a terminal device.

It should be understood that the foregoing listed cases of the receiving devices of the first reference signal and the second reference signal are merely examples for description, and this embodiment of the present invention is not limited thereto. For example, the receiving devices of the first reference signal and the second reference signal may be the same.

Optionally, the second reference signal is sent by the first sending device.

Specifically, the sending device #A (namely, an example of the first sending device) generates the reference signal #B (namely, an example of the second reference signal). A process of generating the reference signal #B may be similar to that in the prior art. To avoid repetition, detailed description is omitted herein.

In addition, the sending device #A may determine the code resource (namely, the code resource #B) corresponding to the reference signal #B.

In this case, the receiving device of the reference signal #B may be different from the receiving device of the reference signal #A.

For example, the first sending device is a first network device, the first receiving device is a terminal device, and the second receiving device is a second network device.

Specifically, in this embodiment of the present invention, the sending device #A may be used as the sending device of both the reference signal #B and the reference signal #A. In this case, for example, the sending device #A may be a network device (namely, the first network device).

In addition, for example, the receiving device of the reference signal #A may be a terminal device. To be specific, a communication link corresponding to the reference signal #A may be a cellular link.

For another example, the receiving device of the reference signal #B may be a network device (namely, an example of the second network device). To be specific, a communication link corresponding to the reference signal #B may be a backhaul link.

It should be understood that the foregoing listed cases of the sending devices and the receiving devices of the reference signal #A and the reference signal #B are merely examples for description. This is not particularly limited in this embodiment of the present invention. In other words, the sending devices of the reference signal #A and the reference signal #B may be the same, or may be different, and the receiving devices of the reference signal #A and the reference signal #B may be the same, or may be different. This is not particularly limited in this embodiment of the present invention, provided that it is ensured that the types of the reference signal #A and the reference signal #B are different (in other words, at least one signal parameter is different).

In addition, in this embodiment of the present invention, the reference signal #B may be sent by a sending device #B (a sending device different from the sending device #A). In this case, the sending device #B (namely, an example of a second sending device) generates the reference signal #B (namely, an example of the second reference signal). A process of generating the reference signal #B may be similar to that in the prior art. To avoid repetition, detailed description is omitted herein. In addition, the sending device #B may determine the code resource #B (namely, an example of a second code resource) corresponding to the reference signal #B.

In conclusion, in this embodiment of the present invention, the sending devices and the receiving devices of the reference signal #A and the reference signal #B may include the following cases:

Case 1

The sending devices of the reference signal #A and the reference signal #B are the same, and the receiving devices of the reference signal #A and the reference signal #B are also the same. In this case, functions (namely, at least one signal parameter) of the reference signal #A and the reference signal #B are different.

Case 2

The sending devices of the reference signal #A and the reference signal #B are the same, and the receiving devices of the reference signal #A and the reference signal #B are different. In this case, functions (namely, at least one signal parameter) of the reference signal #A and the reference signal #B may be the same, or may be different.

As an example rather than a limitation, in this case, for example, the sending devices of the reference signal #A and the reference signal #B may be a network device, the receiving device of the reference signal #A may be a terminal device, and the receiving device of the reference signal #B may be a network device.

Case 3

The sending devices of the reference signal #A and the reference signal #B are different, and the receiving devices of the reference signal #A and the reference signal #B are the same. In this case, functions (namely, at least one signal parameter) of the reference signal #A and the reference signal #B may be the same, or may be different.

Case 4

The sending devices of the reference signal #A and the reference signal #B are different, and the receiving devices of the reference signal #A and the reference signal #B are also different. In this case, functions (namely, at least one signal parameter) of the reference signal #A and the reference signal #B may be the same, or may be different.

To be specific, in case 4, the reference signal #A and the reference signal #B may be reference signals transmitted in different cells.

As an example rather than a limitation, in this case, for example, the sending device of the reference signal #A may be a terminal device, the receiving device of the reference signal #A may be a network device, the sending device of the reference signal #B may be a network device, and the receiving device of the reference signal #B may be a terminal device. To be specific, the reference signal #A may be an uplink reference signal of a cell, and the reference signal #A may be a downlink reference signal of another cell.

It should be noted that the foregoing listed case in which the code resource #A is orthogonal to the code resource #B is merely an example for description, and this embodiment of the present invention is not limited thereto, provided that it is ensured that the code resource #A is different from the code resource #B, and the reference signal #A and the reference signal #B can be multiplexed on a same time-frequency resource based on the code resource #A and the code resource #B.

In addition, in this embodiment of the present invention, a code length of the code resource #A and a code length of the code resource #B may be the same, or may be different. This is not particularly limited in this embodiment of the present invention.

In addition, in this embodiment of the present invention, the sending device of the reference signal #A may be a network device or a terminal device, and the receiving device of the reference signal #A may be a network device or a terminal device; likewise, the sending device of the reference signal #B may be a network device or a terminal device, and the receiving device of the reference signal #B may be a network device or a terminal device. This is not particularly limited in this embodiment of the present invention.

In addition, in S210, the receiving device (which is marked as a receiving device #A below for ease of understanding) of the reference signal #A may determine the code resource #A, and a process of determining the code resource #A by the receiving device #A may be similar to the process of determining the code resource #A by the sending device #A. To avoid repetition, detailed description is omitted herein.

In S220, the sending device #A may determine a time-frequency resource (namely, an example of at least one first time-frequency resource group, which is marked as a time-frequency resource #1 below for ease of understanding and description) used to transmit the reference signal #A (or used to transmit the reference signal #A and a reference signal #B).

Specifically, in this embodiment of the present invention, the sending device #A may determine the time-frequency resource #1 based on the code length of the code resource #A, so that a value of a quantity of resource elements (REs) occupied by the time-frequency resource #1 is corresponding to a value of the code length of the code resource #A. For example, in this embodiment of the present invention, the time-frequency resource #1 may include a plurality of time-frequency resource groups, and a size (for example, a quantity of included REs) of each time-frequency resource group may be the same as the code length of the code resource #A, that is, a value of a size of the time-frequency resource #1 may be a positive integer multiple of the value of the code length of the code resource #A.

It should be understood that the foregoing listed relationship between the code resource #A and the time-frequency resource #1 is merely an example for description, and this embodiment of the present invention is not limited thereto. For example, the value of the quantity of REs occupied by the time-frequency resource #1 may be greater than or equal to the value of the code length of the code resource #A. This is not particularly limited in this embodiment of the present invention.

In this embodiment of the present invention, the communications system may provide a plurality of time-frequency resource groups (including the first time-frequency resource group and the second time-frequency resource group).

In addition, each time-frequency resource group may include a stipulated quantity of resource elements in system time-frequency resources, and the resource element may be a smallest division unit of a time-frequency resource. For example, one resource element may be corresponding to one RE.

For example, optionally, each of the at least one first time-frequency resource group occupies 4N REs, each of the at least one second time-frequency resource group occupies 4M REs, N is an integer greater than or equal to 1, and M is an integer greater than or equal to 1.

In other words, as an example rather than a limitation, in this embodiment of the present invention, one time-frequency resource group may include a quantity of REs that is a positive integer multiple of 4.

It should be understood that the foregoing listed quantity of REs included in one time-frequency resource group is merely an example for description, and this embodiment of the present invention is not limited thereto. For example, one time-frequency resource group may include a quantity of REs that is a positive integer multiple of 2.

Figure 4:
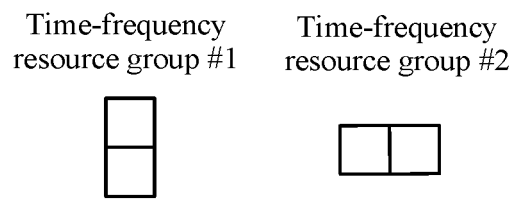
FIG. 4 is a schematic diagram of an example of a time-frequency resource group according to an embodiment of the present invention.

For example, in this embodiment of the present invention, as shown in FIG. 4, one time-frequency resource group may include two REs. In addition, a relationship between locations of the two REs may be indicated by a time-frequency resource group #1, or may be indicated by a time-frequency resource group #2.

Figure 5:
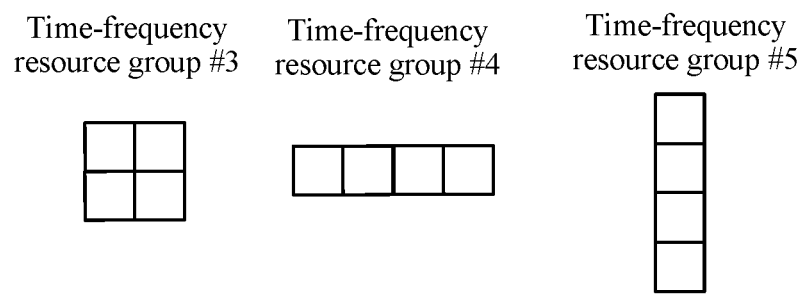
FIG. 5 is a schematic diagram of another example of a time-frequency resource group according to an embodiment of the present invention.

Alternatively, as shown in FIG. 5, one time-frequency resource group may include four REs. In addition, a relationship between locations of the four REs may be indicated by a time-frequency resource group #3, may be indicated by a time-frequency resource group #4, or may be indicated by a time-frequency resource group #5.

Figure 6:
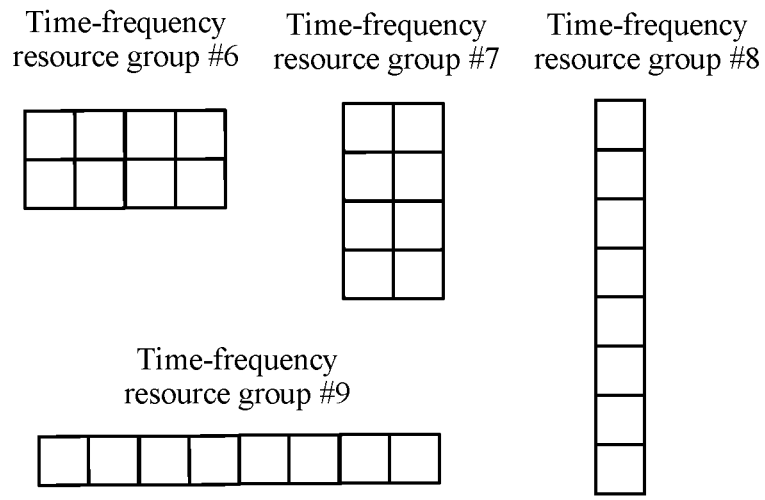
FIG. 6 is a schematic diagram of still another example of a time-frequency resource group according to an embodiment of the present invention.

Alternatively, as shown in FIG. 6, one time-frequency resource group may include eight REs. In addition, a relationship between locations of the eight REs may be indicated by a time-frequency resource group #6, may be indicated by a time-frequency resource group #7, may be indicated by a time-frequency resource group #8, or may be indicated by a time-frequency resource group #9.

Figure 7:
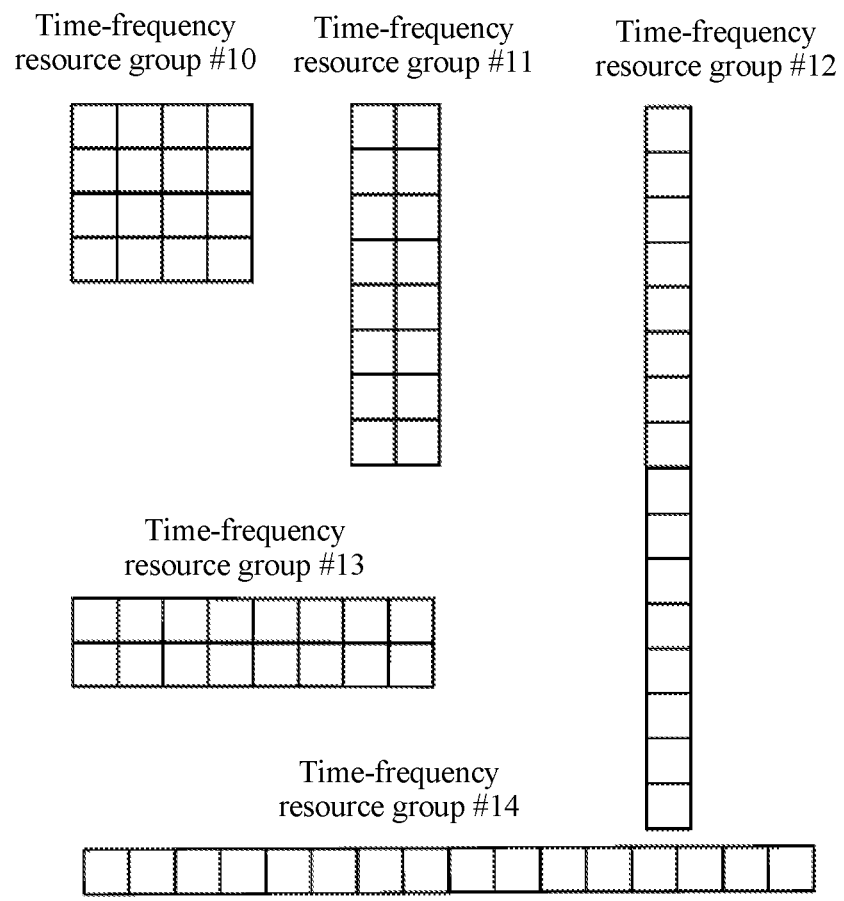
FIG. 7 is a schematic diagram of still another example of a time-frequency resource group according to an embodiment of the present invention.

Alternatively, as shown in FIG. 7, one time-frequency resource group may include 16 REs. In addition, a relationship between locations of the 16 REs may be indicated by a time-frequency resource group #10, may be indicated by a time-frequency resource group #11, may be indicated by a time-frequency resource group #12, may be indicated by a time-frequency resource group #13, or may be indicated by a time-frequency resource group #14.

In this embodiment of the present invention, quantities of resource elements (for example, REs) included in any two time-frequency resource groups may be the same, or may be different. This is not particularly limited in this embodiment of the present invention.

In addition, in this embodiment of the present invention, locations of any two time-frequency resource groups in the system time-frequency resources may be the same, or may be different. This is not particularly limited in this embodiment of the present invention.

It should be noted that in this embodiment of the present invention, REs included in one time-frequency resource group may be configured in a centralized manner (or continuously), or may be configured in a distributed manner. This is not particularly limited in this embodiment of the present invention.

As an example rather than a limitation, for example, in this embodiment of the present invention, one time-frequency resource group may occur periodically (including a period in time domain and/or a period in frequency domain) in the system time-frequency resources, or in this embodiment of the present invention, one time-frequency resource group may occur at a fixed location (including a location in time domain and/or a location in frequency domain) in the system time-frequency resources. This is not particularly limited in this embodiment of the present invention.

For another example, in this embodiment of the present invention, one code resource may be corresponding to one or more time-domain resource groups, and in this embodiment of the present invention, a network device may store mapping relationship information #A (which may also be referred to as first mapping relationship information) used to indicate a time-frequency resource group corresponding to each code resource.

For still another example, in this embodiment of the present invention, a network device may determine, based on channel quality of a channel used to transmit a reference signal or a link condition of a link used to transmit a reference signal, a location of a time-frequency resource group used to carry the reference signal (specifically, a location in the system time-frequency resources) and a quantity of time-frequency resource groups. For example, if the channel quality or the link condition is relatively good, a relatively small quantity of time-frequency resource groups may be used. If the channel quality or the link condition is relatively poor, a relatively large quantity of time-frequency resource groups may be used.

Therefore, when the sending device #A is a network device, the sending device #A may determine, based on the code resource #A used by the reference signal #A and the mapping relationship information #A, a time-frequency resource groups (namely, an example of the first time-frequency resource group, marked as time-frequency resource groups #A below for ease of understanding and distinguishing) corresponding to the code resource #A, and use the time-frequency resource groups as the time-frequency resource group #1 used to send the reference signal #A, where α≥1. In addition, time-frequency resources corresponding to the α time-frequency resource groups #A are the time-frequency resource #1. In addition, a value of a quantity of REs included in each time-frequency resource group #A is the same as the value of the length of the code resource #A.

When the sending device #A is a terminal device, a network device that the sending device #A accesses may determine the time-frequency resource group #A based on the code resource #A used by the reference signal #A and the mapping relationship #A, and send indication information of the time-frequency resource group #A to the sending device #A.

Alternatively, in this embodiment of the present invention, one type of reference signal may be corresponding to one or more time-domain resource groups, and in this embodiment of the present invention, a network device may store mapping relationship information #B (which may also be referred to as second mapping relationship information) used to indicate a time-frequency resource group corresponding to each type of reference signal.

Therefore, when the sending device #A is a network device, the sending device #A may determine, based on the type of the reference signal #A and the mapping relationship #B, the time-frequency resource group #A corresponding to the type of the reference signal #A.

When the sending device #A is a terminal device, a network device that the sending device #A accesses may determine the time-frequency resource group #A based on the type of the reference signal #A and the mapping relationship #B, and send indication information of the time-frequency resource group #A to the sending device #A.

Likewise, when the receiving device (which is marked as the receiving device #A below for ease of understanding) of the reference signal #A is a network device, the receiving device #A may determine the time-frequency resource group #A based on the code resource #A used by the reference signal #A and the mapping relationship #A.

When the receiving device #A is a terminal device, a network device that the receiving device #A accesses may determine the time-frequency resource group #A based on the code resource #A used by the reference signal #A and the mapping relationship #A, and send indication information of the time-frequency resource group #A to the receiving device #A.

Therefore, when the receiving device #A is a network device, the receiving device #A may determine the time-frequency resource group #A based on the type of the reference signal #A and the mapping relationship #B.

When the receiving device #A is a terminal device, a network device that the receiving device #A accesses may determine the time-frequency resource group #A based on the type of the reference signal #A and the mapping relationship #B, and send indication information of the time-frequency resource group #A to the receiving device #A.

In addition, in this embodiment of the present invention, a manner of determining β time-frequency resource groups (namely, an example of the second time-frequency resource group, marked as time-frequency resource groups #B below for ease of understanding and distinguishing) used to carry the reference signal #B may be similar to the manner of determining the time-frequency resource group #A. To avoid repetition, detailed description is omitted herein. β≥1, and time-frequency resources corresponding to the β time-frequency resource groups #B are the time-frequency resource #1. In addition, a value of a quantity of REs included in each time-frequency resource group #B is the same as the value of the length of the code resource #B.

In this embodiment of the present invention, a location of each time-frequency resource group in the system time-frequency resources may be stipulated by the system or the communications protocol. In this case, a sending device and a receiving device may directly determine a time-frequency location of a selected time-frequency resource group.

Alternatively, in this embodiment of the present invention, a location, in the system time-frequency resources, of a time-frequency resource group used to transmit a reference signal may be determined and indicated by a network device to a terminal device.

As an example rather than a limitation, the network device may indicate at least one piece of the following information to the terminal device, so that the terminal device determines the location of the time-frequency resource group in the system time-frequency resources:

a time-domain period of the time-frequency resource group;

a time-domain offset (for example, relative to a reference moment acknowledged by the network device and the terminal device) of the time-frequency resource group;

time-domain duration of the time-frequency resource group;

a frequency-domain period of the time-frequency resource group;

a frequency-domain offset (for example, relative to a reference frequency acknowledged by the network device and the terminal device) of the time-frequency resource group; and a frequency-domain range of the time-frequency resource group.

In this case, because the network device needs to send, to the terminal device, indication information used to indicate the determined location of the time-frequency resource group in the system time-frequency resources, in this case, if a quantity of system time-frequency resources is relatively large, and a quantity of time-frequency resource groups is relatively large, an information amount of the indication information is relatively large.

Therefore, in this embodiment of the present invention, the system time-frequency resources may be divided into a plurality of time-frequency resource sets based on a stipulation of the communications system or the communications protocol, and one time-frequency resource group may be located in one or more time-frequency resource sets.

It should be noted that in this embodiment of the present invention, a first time-frequency resource set may belong to the plurality of time-frequency resource sets, and there may be one or more first time-frequency resource sets. This is not particularly limited in this embodiment of the present invention.

The sending device and the receiving device may first determine a time-frequency resource set in which a time-frequency resource group is located, and then determine the time-frequency resource group from the time-frequency resource set, so as to reduce the information amount of the indication information.

The following describes configuration of a time-frequency resource set in time domain.

For example, in this embodiment of the present invention, a location of a time-frequency resource set in time domain may be fixed.

Figure 8:
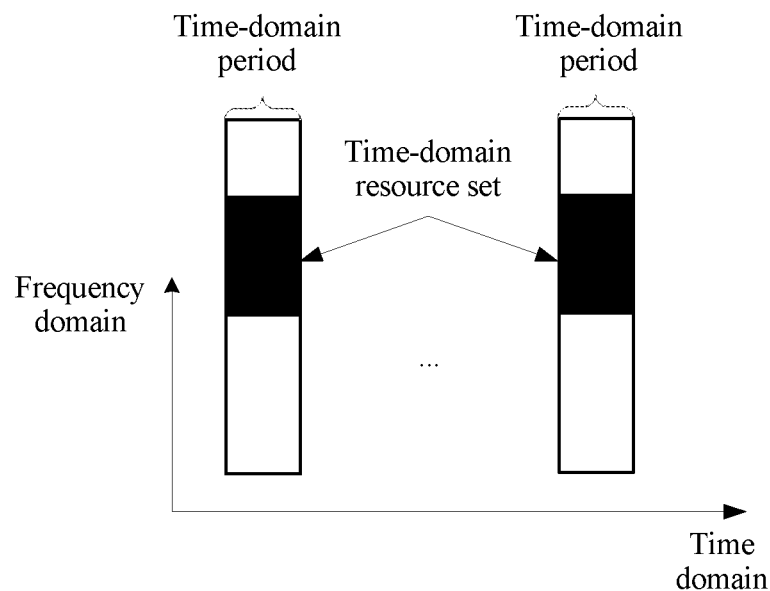
FIG. 8 is a schematic diagram of an example of a time-frequency resource set according to an embodiment of the present invention.

Alternatively, as shown in FIG. 8, a time-frequency resource set may repeatedly occur in time domain with a time-domain period of stipulated duration. In other words, in this embodiment of the present invention, a period in which the time-frequency resource set occurs in the system time-frequency resources may include the time-domain period.

Figure 9:
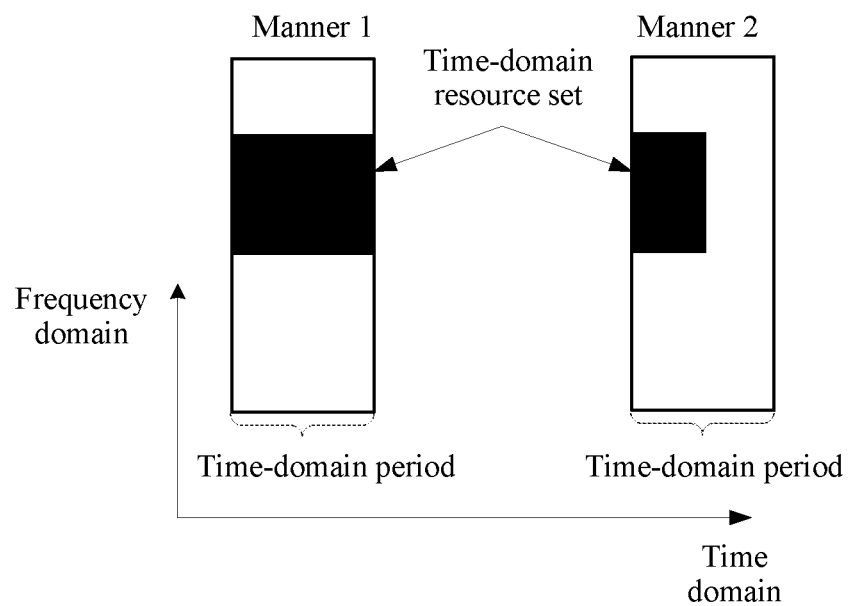
FIG. 9 is a schematic diagram of another example of a time-frequency resource set according to an embodiment of the present invention.

A range within which the time-frequency resource set occurs in one time-domain period may cover the entire time-domain period, for example, as shown in manner 1 in FIG. 9.

Alternatively, a range within which the time-frequency resource set occurs in one time-domain period may cover a part of the period, for example, as shown in manner 2 in FIG. 9.

The following describes configuration of a time-frequency resource set in frequency domain.

For example, in this embodiment of the present invention, a location of a time-frequency resource set in frequency domain may be fixed.

Alternatively, a time-frequency resource set may repeatedly occur in frequency domain with a frequency-domain period of a stipulated frequency-domain width. In other words, in this embodiment of the present invention, a period in which the time-frequency resource set occurs in the system time-frequency resources may include the frequency-domain period.

It should be understood that the foregoing listed manner of configuring the time-frequency resource set is merely an example for description, and this embodiment of the present invention is not limited thereto. For example, the time-frequency resource set may repeatedly occur in frequency domain with the frequency-domain period of the stipulated frequency-domain width, and the time-frequency resource set may repeatedly occur in time domain with the time-domain period of the stipulated duration. In other words, in this embodiment of the present invention, a period in which the time-frequency resource set occurs in the system time-frequency resources may include both the frequency-domain period and the time-domain period.

In this embodiment of the present invention, the system time-frequency resources may be divided into a plurality of resource blocks (RBs) based on a stipulation of the communications system or the communications protocol.

In this embodiment of the present invention, one time-frequency resource set may include one or more RBs.

Figure 10:
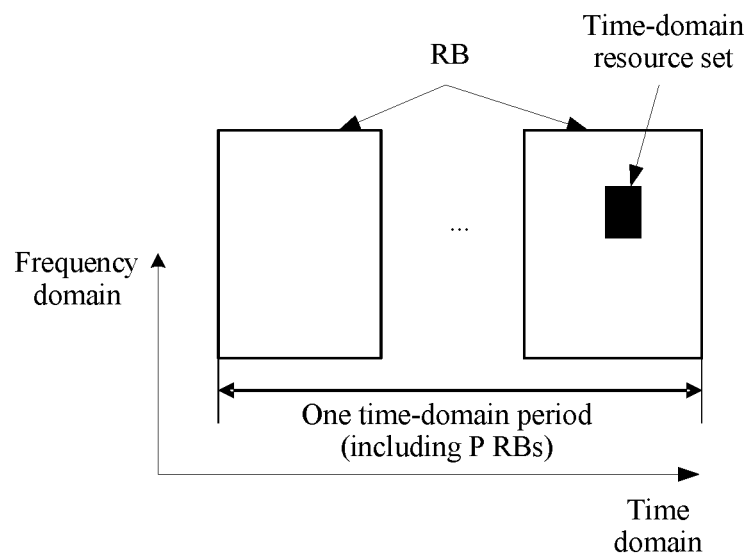
FIG. 10 is a schematic diagram of still another example of a time-frequency resource set according to an embodiment of the present invention.

In this case, for example, as shown in FIG. 10, a period in which a time-frequency resource set occurs in the system time-frequency resources may be a time-domain period, one time-domain period may include P RBs that are one-dimensionally arranged in time domain, one time-frequency resource set may include one or more RBs at stipulated time-domain locations in the P RBs, and $P \geq 2$.

Figure 11:
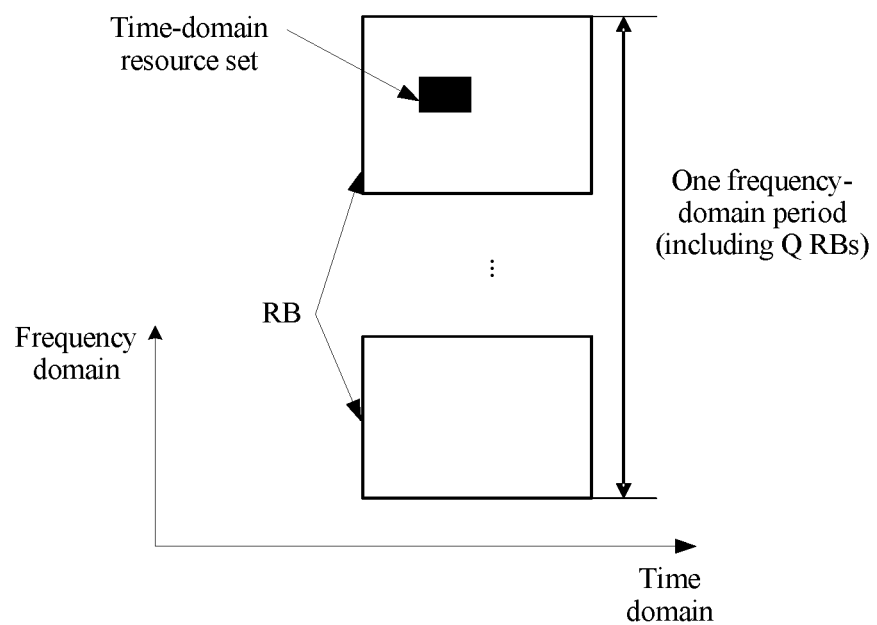
FIG. 11 is a schematic diagram of still another example of a time-frequency resource set according to an embodiment of the present invention.

For another example, as shown in FIG. 11, a period in which a time-frequency resource set occurs in the system time-frequency resources may be a frequency-domain period, one frequency-domain period may include Q RBs that are one-dimensionally arranged in frequency domain, one time-frequency resource set may include one or more RBs at stipulated frequency-domain locations in the Q RBs, and $Q \geq 2$.

Figure 12:
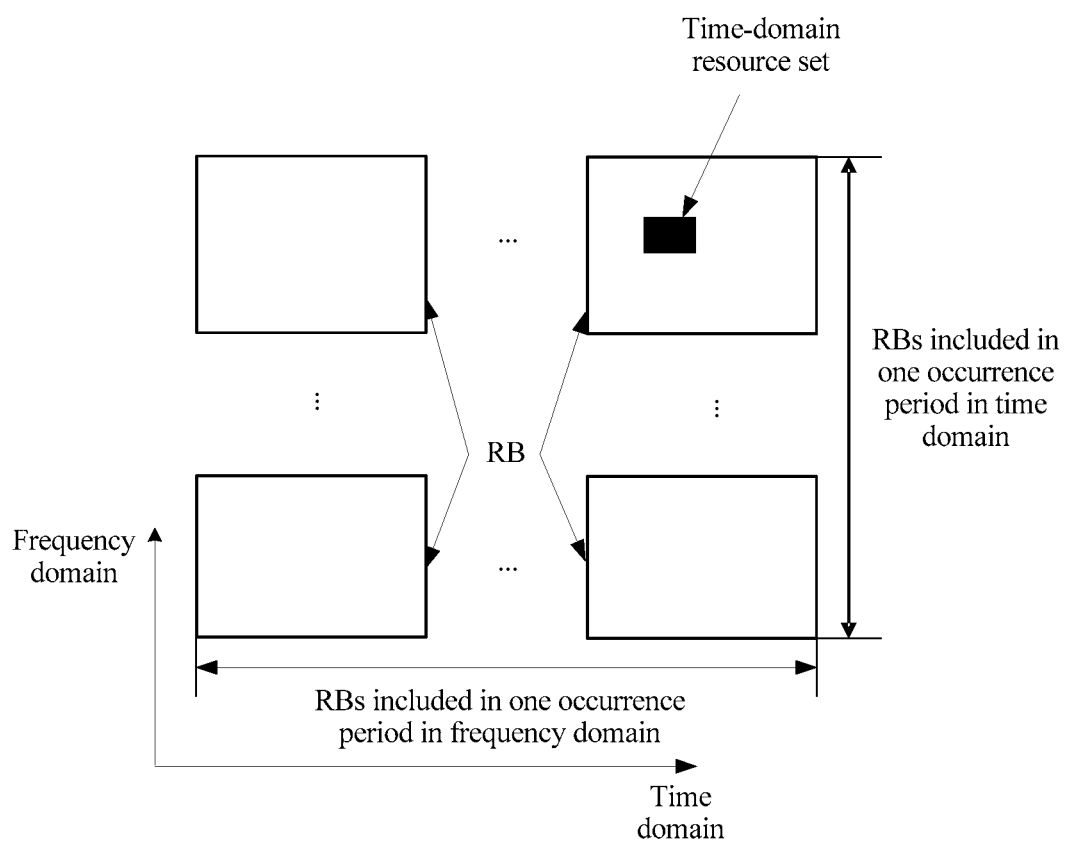
FIG. 12 is a schematic diagram of still another example of a time-frequency resource set according to an embodiment of the present invention.

For still another example, as shown in FIG. 12, in this embodiment of the present invention, a period in which a time-frequency resource set occurs in the system time-frequency resources may include both a frequency-domain period and a time-domain period. To be specific, each occurrence period includes W two-dimensionally arranged RBs, one time-frequency resource set may include one or more RBs at stipulated frequency-domain locations in the W RBs, and $W \geq 3$.

It should be understood that the foregoing listed manner of constituting the time-frequency resource set is merely an example for description, and this embodiment of the present invention is not limited thereto. Other set division manners that can be used to distinguish between time-frequency resources (for example, REs) in a plurality of system time-frequency resources shall fall within the protection scope of the embodiments of the present invention.

Figure 13:
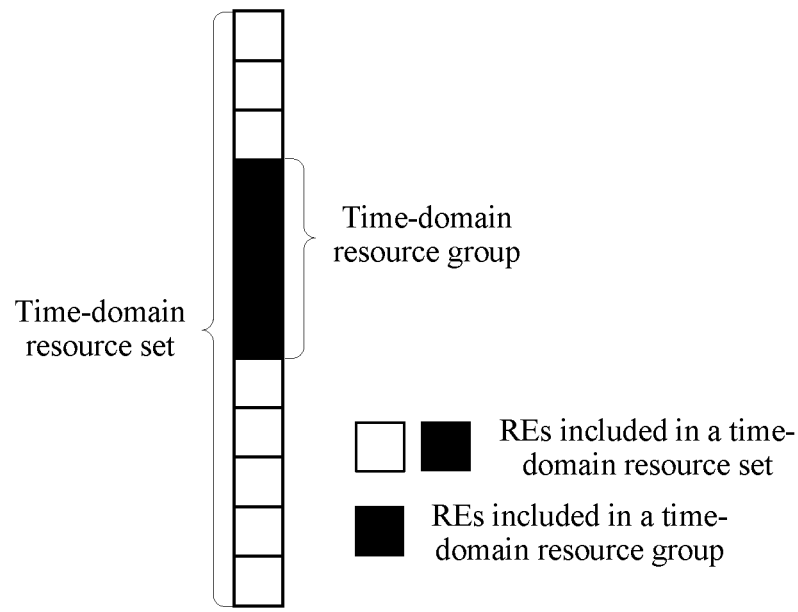
FIG. 13 is a schematic diagram of still another example of a time-frequency resource set according to an embodiment of the present invention.

For example, as shown in FIG. 13, one time-frequency resource set may include one symbol in time domain and include 12 subcarriers in frequency domain.

Figure 14:
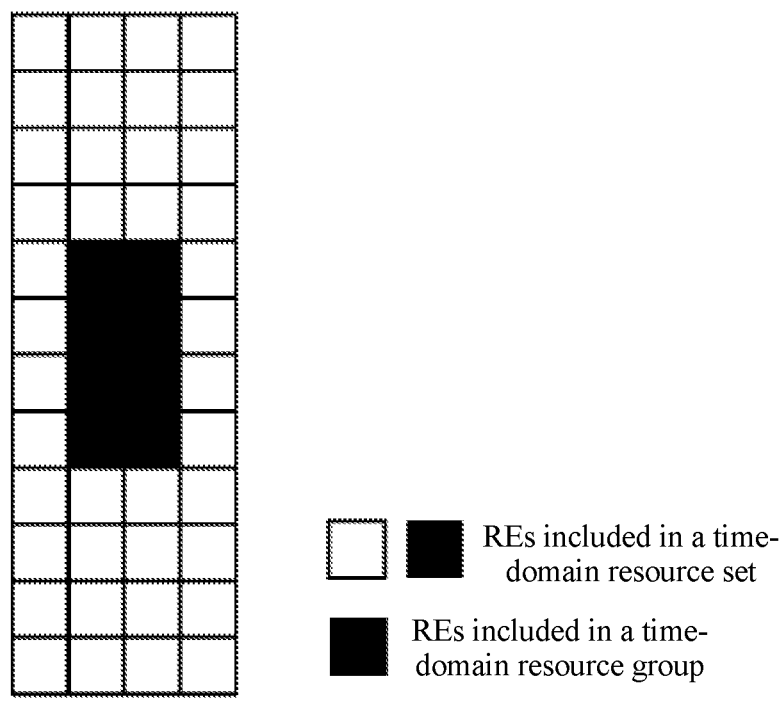
FIG. 14 is a schematic diagram of still another example of a time-frequency resource set according to an embodiment of the present invention.
Figure 15:
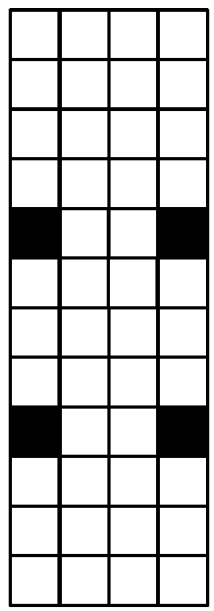
FIG. 15 is a schematic diagram of still another example of a time-frequency resource set according to an embodiment of the present invention.
Figure 16:
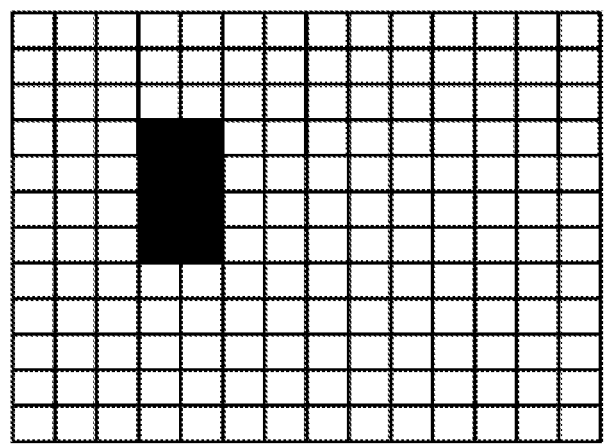
FIG. 16 is a schematic diagram of still another example of a time-frequency resource set according to an embodiment of the present invention.
Figure 17:
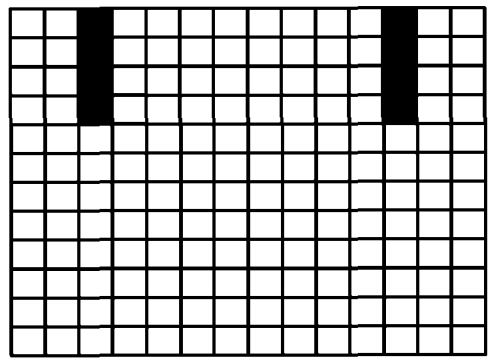
FIG. 17 is a schematic diagram of still another example of a time-frequency resource set according to an embodiment of the present invention.
Figure 18:
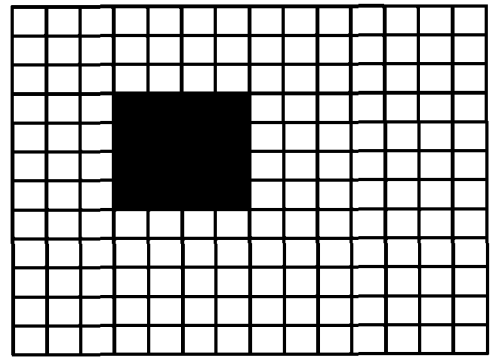
FIG. 18 is a schematic diagram of still another example of a time-frequency resource set according to an embodiment of the present invention.
Figure 19:
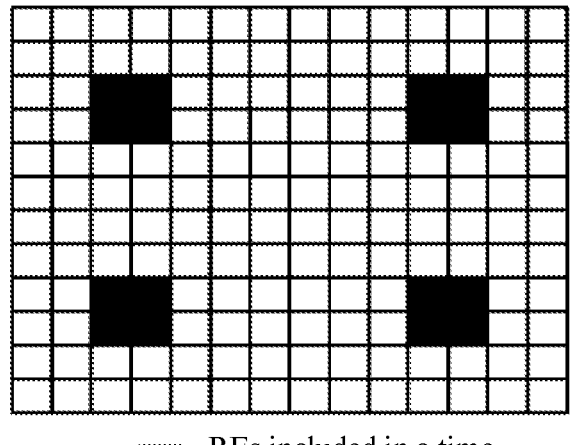
FIG. 19 is a schematic diagram of still another example of a time-frequency resource set according to an embodiment of the present invention.
Figure 20:
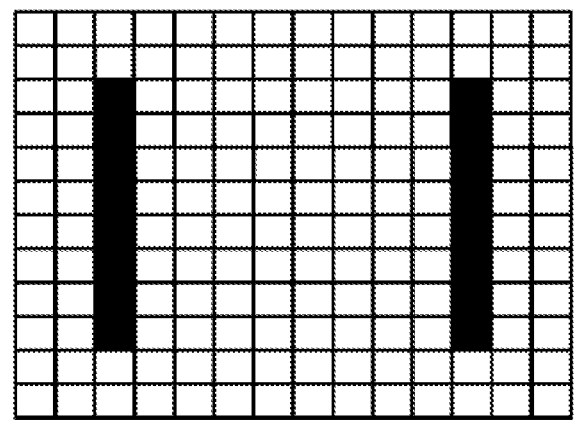
FIG. 20 is a schematic diagram of still another example of a time-frequency resource set according to an embodiment of the present invention.

For another example, as shown in FIG. 14 and FIG. 15, one time-frequency resource set may include four symbols in time domain and include 12 subcarriers in frequency domain.

For still another example, as shown in FIG. 16 to FIG. 20, one time-frequency resource set may include 14 symbols in time domain and include 12 subcarriers in frequency domain.

It should be understood that the foregoing listed manners of constituting the time-frequency resource set in FIG. 13 to FIG. 20 are merely examples for description, and this embodiment of the present invention is not limited thereto. A quantity of time-domain resources and/or a quantity of frequency-domain resources included in one time-frequency resource set may be randomly modified as required. For example, one time-frequency resource set may include seven symbols in time domain.

The following describes a manner of configuring a time-frequency resource group in a time-frequency resource set.

In time domain:

For example, as shown in FIG. 13, in this embodiment of the present invention, one time-frequency resource group may include all time periods (for example, all symbols) in time domain in a time-frequency resource set in which the time-frequency resource group is located.

Alternatively, as shown in FIG. 14 to FIG. 20, one time-frequency resource group may include some time periods (for example, some symbols) in a time-frequency resource set in which the time-frequency resource group is located.

In frequency domain:

For example, in this embodiment of the present invention, one time-frequency resource group may include all frequency bands (for example, all subcarriers) in frequency domain in a time-frequency resource set in which the time-frequency resource group is located.

Alternatively, as shown in FIG. 14 to FIG. 20, one time-frequency resource group may include some frequency bands (for example, some subcarriers) in a time-frequency resource set in which the time-frequency resource group is located.

The following describes a manner of indicating a time-frequency resource that is used to carry a reference signal and that is based on a time-frequency resource set and a time-frequency resource group.

A manner of determining a time-frequency resource set is first described.

For example, in this embodiment of the present invention, a location of each of a plurality of time-frequency resource sets in the system time-frequency resources may be fixed (for example, stipulated by the communications system or the communications protocol). In this case, a network device does not need to send indication information (namely, an example of first indication information) of the time-frequency resource set to a terminal device.

For another example, in this embodiment of the present invention, a location of each of a plurality of time-frequency resource sets in the system time-frequency resources may dynamically change. In this case, a network device may send, to a terminal device, indication information (namely, another example of first indication information) used to indicate the location of each time-frequency resource set in the system time-frequency resources.

For still another example, in this embodiment of the present invention, locations of some time-frequency resource sets (which are marked as dynamic time-frequency resource sets below for ease of understanding and distinguishing) in a plurality of time-frequency resource sets in the system time-frequency resources may dynamically change, and locations of the other time-frequency resource sets (which are marked as fixed time-frequency resource sets below for ease of understanding and distinguishing) in the plurality of time-frequency resource sets in the system time-frequency resources may be fixed. In this case, a network device may send, to a terminal device, indication information (namely, another example of first indication information) used to indicate a location of each dynamic time-frequency resource set in the system time-frequency resources.

It should be noted that in this embodiment of the present invention, an address may be allocated to each time-frequency resource in the system time-frequency resources, and the first indication information may be indication information of addresses of time-frequency resources corresponding to one or more time-frequency resource sets.

Alternatively, in this embodiment of the present invention, locations (for example, addresses) of one or more time-frequency resources (which are marked as initial time-frequency resources below for ease of understanding and description) in the system time-frequency resources may be determined by a network device and a terminal device through negotiation or stipulated by the communications protocol. In this case, the first indication information may be indication information of sizes (for example, a quantity of included RBs or REs) of the one or more time-frequency resource sets and offsets relative to the initial time-frequency resources.

As described above, based on a stipulation of the communications system or the communications protocol and/or the first indication information, the network device and the terminal device may determine, through negotiation, a time-frequency resource set (namely, an example of the first time-frequency resource set) in which a time-frequency resource group (namely, an example of the first time-frequency resource group) used to transmit a reference signal (for example, the first reference signal) is located.

It should be noted that in this embodiment of the present invention, locations of one or more first time-frequency resource sets may be fixed. In this case, an indication of the first indication information is not needed.

Alternatively, in this embodiment of the present invention, locations of one or more first time-frequency resource sets may dynamically change. In this case, all of the one or more first time-frequency resource sets need to be indicated by using the first indication information.

Alternatively, in this embodiment of the present invention, locations of some of a plurality of first time-frequency resource sets may be fixed, and locations of the other first time-frequency resource sets may dynamically change. In this case, the first time-frequency resource sets that are in the plurality of first time-frequency resource sets and whose locations dynamically change need to be indicated by using the first indication information.

It should be understood that the foregoing listed manner of indicating the time-frequency resource set is merely an example for description, and this embodiment of the present invention is not limited thereto. For example, the first indication information may further indicate at least one of the following attributes:

a time-domain period of the time-frequency resource set;

a time-domain offset (for example, relative to a reference moment acknowledged by a network device and a terminal device) of the time-frequency resource set;

time-domain duration of the time-frequency resource set;

a frequency-domain period of the time-frequency resource set;

a frequency-domain offset (for example, relative to a reference frequency acknowledged by a network device and a terminal device) of the time-frequency resource set; and a frequency-domain range of the time-frequency resource set.

The following describes a manner of determining a time-frequency resource group.

For example, in this embodiment of the present invention, a location of a time-frequency resource group in a time-frequency resource set in which the time-frequency resource group is located may be fixed (for example, stipulated by the communications system or the communications protocol). In this case, a network device does not need to send indication information (namely, an example of second indication information) of the time-frequency resource set to a terminal device.

For another example, in this embodiment of the present invention, a location of a time-frequency resource group in a time-frequency resource set of the time-frequency resource group dynamically changes. In this case, a network device may send, to a terminal device, indication information (namely, another example of second indication information) used to indicate the location of the time-frequency resource group in the time-frequency resource set of the time-frequency resource group.

For still another example, in this embodiment of the present invention, locations of some time-frequency resources (which are marked as dynamic time-frequency resources below for ease of understanding and distinguishing) in a time-frequency resource group in a time-frequency resource set in which the time-frequency resource group is located may dynamically change, and locations of the other time-frequency resources (which are marked as fixed time-frequency resources below for ease of understanding and distinguishing) in the time-frequency resource group in the time-frequency resource set in which the time-frequency resource group is located may be fixed. In this case, a network device may send, to a terminal device, indication information (namely, another example of second indication information) used to indicate a location of each dynamic time-frequency resource in the time-frequency resource set in which the time-frequency resource group is located.

It should be noted that in this embodiment of the present invention, an address may be allocated to each time-frequency resource in a time-frequency resource set, and the second indication information may be indication information of an address of a time-frequency resource group (which is specifically a dynamic time-frequency resource in the time-frequency resource group).

Alternatively, in this embodiment of the present invention, locations (for example, addresses) of one or more time-frequency resources (which are marked as initial time-frequency resources below for ease of understanding and description) in a time-frequency resource set may be determined by a network device and a terminal device through negotiation or stipulated by the communications protocol. In this case, the second indication information may be indication information of a size (for example, a quantity of included REs) of a time-frequency resource group (which is specifically a dynamic time-frequency resource in the time-frequency resource group) and an offset relative to the initial time-frequency resource.

As described above, based on a stipulation of the communications system or the communications protocol and/or the second indication information, the network device and the terminal device may determine, through negotiation, a location, in a time-frequency resource set in which the time-frequency resource group is located, of a time-frequency resource group used to transmit a reference signal.

Optionally, the first indication information is carried on a physical layer control channel; or
the first indication information is carried on a Media Access Control layer control element; or
the first indication information is carried on radio resource control layer control signaling.

Optionally, the second indication information is carried on a physical layer control channel; or
the second indication information is carried on a Media Access Control layer control element; or
the second indication information is carried on radio resource control layer control signaling.

In addition, in this embodiment of the present invention, the indication information (for example, the first indication information or the second indication information) may be oriented to a particular terminal device, or may be oriented to a group of terminal devices.

In addition, the indication information (for example, the first indication information or the second indication information) may be oriented to all terminal devices in a connected mode that are served by the network device, or may be oriented to a terminal device in a non-connected mode that camps on the network device, or may be oriented to all terminal devices that can (and/or "are allowed to") read (for example, demodulate and decode) system information of the network device.

Indication information oriented to a particular terminal device may be UE-specific physical layer control signaling such as signaling scrambled by using a cell radio network temporary identifier (C-RNTI), or indication information oriented to a particular terminal device may be a MAC layer command, UE-specific RRC signaling, or other UE-specific higher layer signaling.

Indication information oriented to a group of terminal devices may be UE group-specific physical layer control signaling such as signaling scrambled by using a UE group-specific radio network temporary identifier (RNTI), or indication information oriented to a group of terminal devices may be a MAC layer command, UE group-specific RRC signaling, or other UE group-specific higher layer signaling.

Information oriented to all terminal devices in a connected mode that are served by the network device may be placed, by using a broadcast channel and a multicast channel, in a master information block (MIB) or in a system information block (SIB) that can be read by the terminal devices in a connected state, or may be placed in an RRC layer common information element (common IE).

Indication information oriented to the terminal device in a non-connected mode that camps on the network device may be placed in a MIB, and in a MIB and a SIB that can be read by the terminal device in a non-connected state.

Therefore, in S220, the receiving device #A may determine the time-frequency resource group #A (or the time-frequency resource #1, namely, an example of the first time-frequency resource group) used to transmit the reference signal #A (or used to transmit the reference signal #A and the reference signal #B).

Subsequently, the sending device #A may multiplex the reference signal #A on the time-frequency resource group #A based on the code resource #A, and send the reference signal #A to the receiving device #A. Correspondingly, the receiving device #A may receive reference signals (including the reference signal #A and the reference signal #B) carried on the time-frequency resource group #A, and determine, based on the code resource #A, the reference signal #A from the reference signals carried on the time-frequency resource group #A, to implement a transmission process of the reference signal #A.

In this embodiment of the present invention, a transmission process of the reference signal #B may be similar to the transmission process of the reference signal #A. To avoid repetition, detailed description is omitted herein.

It should be noted that a source of the time-frequency resource used to transmit the reference signal is described above with reference to the "system time-frequency resources". In this embodiment of the present invention, the "system time-frequency resources" may be time-frequency resources that are stipulated by the communications system (for example, the communications system 100) or the communications protocol and that are used when wireless communication is performed between one or more network devices and a terminal device in the communications system.

In this embodiment of the present invention, the system time-frequency resources may be granted time-frequency resources, or may be grant-free time-frequency resources. Alternatively, in this embodiment of the present invention, the sending device and the receiving device may use the system time-frequency resources based on a grant-free transmission scheme, or may use the system time-frequency resources based on a granted manner. This is not particularly limited in this embodiment of the present invention.

A grant-free time-frequency resource is a license-free time-frequency domain resource that does not need to be allocated by the system and that can be shared by communications devices. Resource sharing on a license-free frequency band means that only a limitation on an indicator such as transmit power or out-of-band leakage is stipulated when a particular frequency spectrum is to be used, so as to ensure that a plurality of devices jointly using the frequency band meet a basic coexistence requirement. An operator may implement network capacity offloading by using a license-free frequency band resource, but needs to conform to regulation requirements of different regions and different frequency spectrums on the license-free frequency band resource. These requirements are usually formulated to protect a common system such as radar and ensure that a plurality of systems impose no harmful impact on each other as far as possible to coexist fairly, and include a transmit power limitation, an out-of-band leakage indicator limitation, an indoor and outdoor use limitation, some additional coexistence policies in some regions, and the like. For example, the communications devices can use a time-frequency resource in a contention manner or a listening manner such as a manner stipulated by listen before talk (LBT).

To resolve a large quantity of MTC-type services in a future network, and meet short-delay and high-reliability service transmission, this patent provides a grant-free transmission scheme. Grant-free transmission may be expressed as Grant Free in English. The grant-free transmission herein may be for uplink data transmission. The grant-free transmission may be understood as any one or more of the following meanings, or a combination of some technical features in a plurality of meanings, or other similar meanings.

The grant-free transmission may be as follows: A network device pre-allocates a plurality of transmission resources and notifies a terminal device of the plurality of transmission resources. When the terminal device needs to transmit uplink data, the terminal device selects at least one transmission resource from the plurality of transmission resources pre-allocated by the network device, and sends the uplink data by using the selected transmission resource. The network device detects, on one or more of the plurality of pre-allocated transmission resources, the uplink data sent by the terminal device. The detection may be blind detection, or may be detection performed based on a specific control domain in the uplink data, or may be detection performed in another manner.

The grant-free transmission may be as follows: A network device pre-allocates a plurality of transmission resources and notifies a terminal device of the plurality of transmission resources, so that when the terminal device needs to transmit uplink data, the terminal device selects at least one transmission resource from the plurality of transmission resources pre-allocated by the network device, and sends the uplink data by using the selected transmission resource.

The grant-free transmission may be as follows: Information about a plurality of pre-allocated transmission resources is obtained, and when uplink data needs to be transmitted, at least one transmission resource is selected from the plurality of transmission resources, and the uplink data is sent by using the selected transmission resource. The information may be obtained from a network device.

The grant-free transmission may be a method for transmitting uplink data of a terminal device without dynamic scheduling performed by a network device. The dynamic scheduling may be a scheduling manner in which a network device indicates, by using signaling, a transmission resource to a terminal device for each uplink data transmission of the terminal device. Optionally, transmitting the uplink data of the terminal device may be understood as follows: data of at least two terminal devices is allowed to be transmitted on a same time-frequency resource. Optionally, the transmission resource may be a transmission resource of one or more transmission time units after a moment at which the terminal device receives the signaling. One transmission time unit may be a smallest time unit of one transmission, for example, a transmission time interval (TTI), and a value may be 1 ms. Alternatively, one transmission time unit may be a preset transmission time unit.

The grant-free transmission may be as follows: A terminal device transmits uplink data without a grant of a network device. The grant may mean that the terminal device sends an uplink scheduling request to the network device, and after receiving the scheduling request, the network device sends an uplink grant to the terminal device. The uplink grant indicates an uplink transmission resource allocated to the terminal device.

The grant-free transmission may be a contention transmission manner, and may specifically mean that a plurality of terminals transmit uplink data on a same pre-allocated time-frequency resource at the same time without a grant of a base station.

The data may be service data or signaling data.

The blind detection may be understood as follows: Data that may arrive is detected when it is not predicted whether data is to arrive. The blind detection may also be understood as detection without an explicit signaling indication.

The transmission resource may include but is not limited to a combination of one or more of the following resources:

α: a time-domain resource such as a radio frame, a subframe, or a symbol;

β: a frequency-domain resource such as a subcarrier or a resource block;

γ: a space-domain resource such as a transmit antenna or a beam;

θ: a code resource such as a sparse code multiple access (SCMA) codebook, a low density signature (LDS) sequence, or CDMA code; and δ: an uplink pilot resource.

The transmission resource may be transmitted based on a control mechanism that includes but is not limited to the following control mechanisms:

a: uplink power control such as uplink transmit power upper limit control;

b: modulation and coding scheme setting such as setting of a transport block size, a code rate, or a modulation order; and c: retransmission mechanism such as HARQ mechanism.

A contention transmission unit (CTU) may be a basic transmission resource for grant-free transmission. The CTU may be a transmission resource combining a time, a frequency, and a code domain, or may be a transmission resource combining a time, a frequency, and a pilot, or may be a transmission resource combining a time, a frequency, a code domain, and a pilot.

An access region to which the CTU belongs may be a time-frequency region corresponding to the CTU.

A patent disclosure numbered PCT/CN2014/073084 and entitled "SYSTEM AND METHOD FOR UPLINK GRANT-FREE TRANSMISSION SCHEME" provides a technical solution for uplink grant-free transmission. As described in the disclosure PCT/CN2014/073084, a radio resource may be divided into various CTUs, and UE is mapped to a specific CTU. One group of code may be allocated to each CTU, and the allocated group of code may be a group of CDMA code, or may be an SCMA codebook set, an LDS sequence group, a signature group, or the like. Each code may be corresponding to one group of pilot. A user may select one piece of code and one pilot in a pilot group corresponding to the code, to perform uplink transmission. Content of the disclosure PCT/CN2014/073084 may also be understood as a part of content of the embodiments of the present invention by reference, and details are not described herein.

When entering coverage of a source network device, a terminal device may receive higher layer signaling sent by the network device. The higher layer signaling may carry a CTU access region definition, a total quantity of CTUs, a default mapping rule, and the like. Alternatively, the terminal device may pre-configure a default mapping rule. The terminal device may determine an appropriate CTU to perform grant-free transmission on the CTU. When different terminal devices perform grant-free transmission on a same CTU, in other words, contend for the same CTU, a conflict may occur. The terminal device may determine, based on an indication of the network device, whether there is a conflict. For example, a problem caused by the conflict may be resolved by using an asynchronous HARQ method. However, if a quantity of conflicts exceeds a preset threshold, the network device may be requested to perform CTU re-mapping. The network device sends, to the terminal device, information about a CTU on which re-mapping is performed, so that the terminal device performs grant-free transmission on the CTU on which re-mapping is performed.

In this case, in this embodiment of the present invention, one time-frequency resource set may include one or more CTUs.

As an example rather than a limitation, in this embodiment of the present invention, the grant-free spectrum resource may include an approximately 900 MHz frequency band in the vicinity of 5 GHz and an approximately 90 MHz frequency band in the vicinity of 2.4 GHz.

In addition, in this embodiment of the present invention, the terminal device and the network device may further perform wireless communication by using a granted spectrum resource. In other words, the communications system 100 in this embodiment of the present invention is a communications system that can use a granted frequency band.

The granted time-frequency resource is usually a time-frequency resource that can be used only after the state or the local wireless committee grants an approval, and different systems such as an LTE system and a Wi-Fi system or systems included in different operators cannot share a granted time-frequency resource.

In addition, in some of the embodiments of the present invention, the network device can provide one or more grant-free cells (which may also be referred to as grant-free carriers) and one or more granted cells (which may also be referred to as granted carriers).

It should be understood that the process of indicating the time-frequency resource used to transmit the reference signal in this embodiment of the present invention is described above with reference to the network device and the terminal device. The sending device in this embodiment of the present invention may be a network device, and in this case, the sending device may perform actions of the network device in the indication process. Alternatively, the sending device in this embodiment of the present invention may be a terminal device, and in this case, the sending device may perform actions of the terminal device in the indication process. Likewise, the receiving device in this embodiment of the present invention may be a network device, and in this case, the receiving device may perform actions of the network device in the indication process. Alternatively, the sending device in this embodiment of the present invention may be a terminal device, and in this case, the receiving device may perform actions of the terminal device in the indication process.

Figure 21:
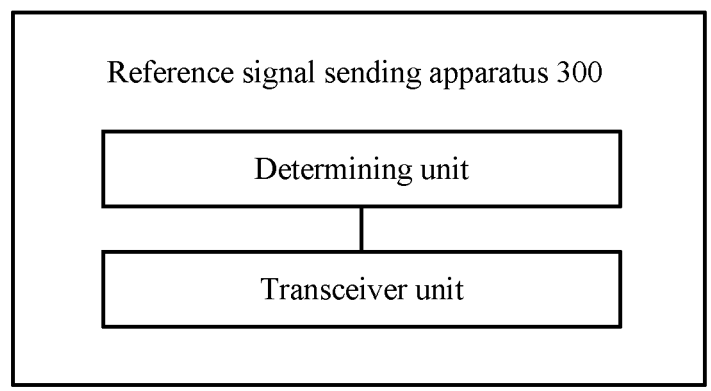
FIG. 21 is a schematic block diagram of a reference signal sending apparatus according to an embodiment of the present invention.

FIG. 21 is a schematic block diagram of a reference signal sending apparatus 300 according to an embodiment of the present invention. The reference signal sending apparatus 300 may be corresponding to the first sending device (for example, the sending device #A) described in the method 200, and modules or units in the reference signal sending apparatus 300 are separately configured to perform actions or processing processes performed by the sending device in the method 200. To avoid repetition, detailed description is omitted herein.

In this embodiment of the present invention, the apparatus 300 may include a processor and a transceiver, and the processor is connected to the transceiver. Optionally, the apparatus further includes a memory, and the memory is connected to the processor. Further optionally, the apparatus includes a bus system. The processor, the memory, and the transceiver may be connected by using the bus system. The memory may be configured to store an instruction, and the processor is configured to execute the instruction stored in the memory, to control the transceiver to send information or a signal.

A determining unit in the apparatus 300 shown in FIG. 21 may be corresponding to the processor, and a transceiver unit in the apparatus 300 shown in FIG. 21 may be corresponding to the transceiver.

Figure 22:
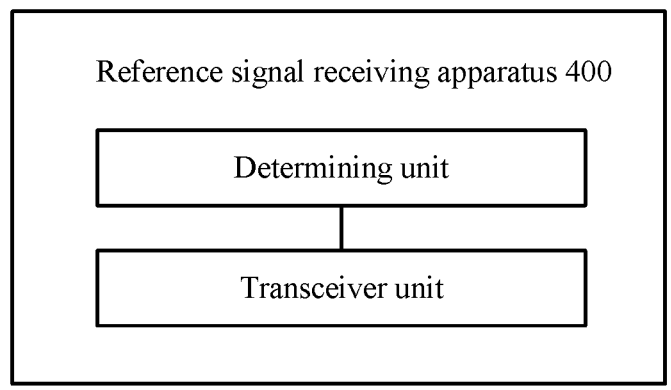
FIG. 22 is a schematic block diagram of a reference signal receiving apparatus according to an embodiment of the present invention.

FIG. 22 is a schematic block diagram of a reference signal receiving apparatus 400 according to an embodiment of the present invention. The reference signal receiving apparatus 400 may be corresponding to the first receiving device (for example, the receiving device #A) described in the method 200, and modules or units in the reference signal receiving apparatus 400 are separately configured to perform actions or processing processes performed by the receiving device in the method 200. To avoid repetition, detailed description is omitted herein.

In this embodiment of the present invention, the apparatus 400 may include a processor and a transceiver, and the processor is connected to the transceiver. Optionally, the apparatus further includes a memory, and the memory is connected to the processor. Further optionally, the apparatus includes a bus system. The processor, the memory, and the transceiver may be connected by using the bus system. The memory may be configured to store an instruction, and the processor is configured to execute the instruction stored in the memory, to control the transceiver to receive information or a signal.

A determining unit in the apparatus 400 shown in FIG. 22 may be corresponding to the processor, and a transceiver unit in the apparatus 400 shown in FIG. 22 may be corresponding to the transceiver.

It should be noted that the foregoing method embodiments in the embodiments of the present invention may be applied to a processor, or may be implemented by a processor. The processor may be an integrated circuit chip and has a signal processing capability. In an implementation process, steps in the foregoing method embodiments may be implemented by using a hardware integrated logical circuit in the processor, or by using instructions in a form of software. The processor may be a general purpose processor, a digital signal processor (DSP), an disclosure-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and completed by a hardware decoding processor, or may be executed and completed by using a combination of hardware in a decoding processor and a software module. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. As an example rather than a limitation, many forms of RAMs may be used, for example, a static random access memory (SRAM), a dynamic random access memory (DRAM), a synchronous dynamic random access memory (SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM). It should be noted that the memory of the systems and methods described in this specification includes but is not limited to these memories and any memory of another proper type.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between associated objects.

It should be understood that sequence numbers of the foregoing processes do not mean execution sequences in various embodiments of the present invention. The execution sequences of the processes should be determined according to functions and internal logic of the processes, and the sequences should not be construed as any limitation on the implementation processes of the embodiments of the present invention.

A person of ordinary skill in the art may be aware that, units and algorithm steps in examples described with reference to the embodiments disclosed in this specification may be implemented by electronic hardware or a combination of computer software and electronic hardware. Whether the functions are performed by hardware or software depends on particular disclosures and design constraints of the technical solutions. A person skilled in the art may use different methods to implement the described functions for each particular disclosure, but it should not be considered that the implementation goes beyond the scope of the embodiments of the present invention.

It may be clearly understood by a person skilled in the art that, for ease and brevity of description, for a detailed working process of the foregoing system, apparatus, and unit, reference may be made to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements, to achieve the objectives of the solutions of the embodiments.

In addition, functional units in the embodiments of the present invention may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of the embodiments of the present invention essentially, or the part contributing to that in the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of the embodiments of the present invention, but are not intended to limit the protection scope of the embodiments of the present invention. Any variation or replacement readily figured out by a person skilled in the art within the technical scope disclosed in the present invention shall fall within the protection scope of the embodiments of the present invention. Therefore, the protection scope of the embodiments of the present invention shall be subject to the protection scope of the claims.

What is claimed is:

1. A reference signal sending method comprising:
   determining, by a first sending device, a first reference signal and a first code resource, wherein the first code resource is orthogonal to a second code resource used to transmit a second reference signal, and wherein the first reference signal is a reference signal of a first type, the second reference signal is a reference signal of a second type that is different from the first type; and sending, by the first sending device, the first reference signal by using the first code resource, wherein the first reference signal is carried by at least one first time-frequency resource group and the second reference signal is carried by at least one second time-frequency resource group wherein a value of a quantity of resource elements (REs) occupied by each of the at least one first time-frequency resource group is the same as a value of a length of the first code resource and a value of a quantity of REs occupied by each of the at least one second time-frequency resource group is the same as a value of a length of the second code resource, wherein the first reference signal and the second reference signal are multiplexed on a time-frequency resource occupied by the at least one first time-frequency resource group, based on the first code resource and the second code resource, wherein the at least one first time-frequency resource group and the at least one second time-frequency resource group occupy a same time-frequency resource, and wherein each of the at least one first time-frequency resource group occupies 2N or 4N REs and each of the at least one second time-frequency resource group occupies 2M or 4M REs, respectively, where each of N and M is an integer greater than 1.

2. The reference signal sending method according to claim 1, wherein each of the at least one first time-frequency resource group occupies two REs, and each of the at least one second time-frequency resource group occupies two REs.

3. The reference signal sending method according to claim 1, wherein either one of the following situations exists:

(a) a function of a reference signal of the first type is different from a function of a reference signal of the second type, and the function of the reference signal of the first type and the function of the reference signal of the second type are two of the following functions:
automatic gain control (AGC) adjustment,
time-frequency synchronization,
phase compensation,
physical data channel demodulation,
physical control channel demodulation,
channel state information measurement,
beam state information measurement,
beam refinement information measurement,
radio resource management (RRM) measurement, and
positioning measurement;
or
(b) uplink/downlink directions of a reference signal of the first type and a reference signal of the second type are different.

4. A reference signal sending apparatus comprising:
a processor; and
a non-transitory computer-readable storage medium coupled to the processor and storing programming instructions for being executed by the processor, the programming instructions, when executed, instruct the processor to:

determine a first reference signal and a first code resource, wherein the first code resource is orthogonal to a second code resource used to transmit a second reference signal, and wherein the first reference signal is a reference signal of a first type, the second reference signal is a reference signal of a second type that is different from the first type; and send the first reference signal by using the first code resource, wherein the first reference signal is carried by at least one first time-frequency resource group and the second reference signal is carried by at least one second time-frequency resource group, wherein a value of a quantity of resource elements (REs) occupied by each of the at least one first time-frequency resource group is the same as a value of a length of the first code resource and a value of a quantity of REs occupied by each of the at least one second time-frequency resource group is the same as a value of a length of the second code resource, wherein the first reference signal and the second reference signal are multiplexed on a time-frequency resource occupied by the at least one first time-frequency resource group, based on the first code resource and the second code resource, wherein the at least one first time-frequency resource group and the at least one second time-frequency resource group occupy a same time-frequency resource, and wherein each of the at least one first time-frequency resource group occupies 2N or 4N REs and each of the at least one second time-frequency resource group occupies 2M or 4M REs, respectively, where each of N and M is an integer greater than 1.

5. The reference signal sending apparatus according to claim 4, wherein each of the at least one first time-frequency resource group occupies two REs, and each of the at least one second time-frequency resource group occupies two REs.

6. The reference signal sending apparatus according to claim 4, wherein either one of the following situations exists:

(a) a function of a reference signal of the first type is different from a function of a reference signal of the second type, and the function of the reference signal of the first type and the function of the reference signal of the second type are two of the following functions:
automatic gain control (AGC) adjustment,
time-frequency synchronization,
phase compensation,
physical data channel demodulation,
physical control channel demodulation,
channel state information measurement,
beam state information measurement,
beam refinement information measurement,
radio resource management (RRM) measurement, or
positioning measurement;
or
(b) uplink/downlink directions of a reference signal of the first type and a reference signal of the second type are different.

7. The reference signal sending apparatus according to claim 4, wherein the programming instructions further instruct the processor to:
  send the first reference signal to a first receiving device; and
  send the second reference signal to a second receiving device by using the second code resource, wherein the reference signal sending apparatus is a network device, the first receiving device is a terminal device, and the second receiving device is a network device.

8. A reference signal receiving apparatus comprising:
a processor; and
a non-transitory computer-readable storage medium coupled to the processor and storing programming instructions for being executed by the processor, the programming instructions, when executed, instruct the processor to:
determine a first code resource,
  wherein the first code resource is orthogonal to a second code resource, the first code resource is used to transmit a first reference signal, the second code resource is used to transmit a second reference signal, the first reference signal is a reference signal of a first type, the second reference signal is a reference signal of a second type that is different from the first type; and
receive the first reference signal by using the first code resource,
  wherein the first reference signal is carried by at least one first time-frequency resource group and the second reference signal is carried by at least one second time-frequency resource group,
  wherein a value of a quantity of resource elements (REs) occupied by each of the at least one first time-frequency resource group is the same as a value of a length of the first code resource and a value of a quantity of REs occupied by each of the at least one second time-frequency resource group is the same as a value of a length of the second code resource, and
  wherein the first reference signal and the second reference signal are multiplexed on a time-frequency resource occupied by the at least one first time-frequency resource group, based on the first code resource and the second code resource,
  wherein the at least one first time-frequency resource group and the at least one second time-frequency resource group occupy a same time-frequency resource, and
  wherein each of the at least one first time-frequency resource group occupies 2N or 4N REs and each of the at least one second time-frequency resource group occupies 2M or 4M REs, respectively, where each of N and M is an integer greater than 1.

9. The reference signal receiving apparatus according to claim 8, wherein each of the at least one first time-frequency resource group occupies two REs, and each of the at least one second time-frequency resource group occupies two REs.

10. The reference signal receiving apparatus according to claim 8, wherein either one of the following exists:
  (a) a function of a reference signal of the first type is different from a function of a reference signal of the second type, and the function of the reference signal of the first type and the function of the reference signal of the second type are two of the following functions:
  automatic gain control (AGC) adjustment,
  time-frequency synchronization,
  phase compensation,
  physical data channel demodulation,
  physical control channel demodulation,
  channel state information measurement,
  beam state information measurement,
  beam refinement information measurement,
  radio resource management (RRM) measurement, and
  positioning measurement;
  or
  (b) uplink/downlink directions of a function of a reference signal of the first type and a reference signal of the second type are different.

11. The reference signal receiving apparatus according to claim 8, wherein the second reference signal is sent to a second receiving device, the first reference signal and the second reference signal are sent by a first sending device, the first sending device is a network device, the reference signal receiving apparatus is a terminal device, and the second receiving device is a network device.

* * * * *

UNITED STATES PATENT AND TRADEMARK OFFICE
CERTIFICATE OF CORRECTION

| | |
|---|---|
| PATENT NO. | : 10,972,237 B2 |
| APPLICATION NO. | : 16/272853 |
| DATED | : April 6, 2021 |
| INVENTOR(S) | : Guo et al. |

Page 1 of 1

It is certified that error appears in the above-identified patent and that said Letters Patent is hereby corrected as shown below:

In the Claims

Claim 1: Column 39, Line 13: "second time-frequency resource group" should read -- second time-frequency resource group, --.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*